(12) United States Patent
Inaji et al.

(10) Patent No.: US 7,177,106 B2
(45) Date of Patent: Feb. 13, 2007

(54) DISK STORAGE APPARATUS

(75) Inventors: Toshio Inaji, Osaka (JP); Hiroshi Kohso, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 337 days.

(21) Appl. No.: 10/079,850

(22) Filed: Feb. 22, 2002

(65) Prior Publication Data

US 2002/0149869 A1    Oct. 17, 2002

(30) Foreign Application Priority Data

Feb. 26, 2001  (JP)  ............................ P2001-050896
Mar. 16, 2001  (JP)  ............................ P2001-075519

(51) Int. Cl.
*G11B 15/04*    (2006.01)
*G11B 19/04*    (2006.01)

(52) U.S. Cl. ........................................................ 360/60

(58) Field of Classification Search .................. 360/31, 360/53, 75, 77.06, 73.08
See application file for complete search history.

(56) References Cited

U.S. PATENT DOCUMENTS

| | | | |
|---|---|---|---|
| 4,246,536 A | | 1/1981 | Bradley et al. |
| 4,679,103 A | | 7/1987 | Workman |
| 5,285,431 A | | 2/1994 | Ogawa et al. |
| 5,378,976 A | * | 1/1995 | Inaji et al. ................... 318/810 |
| 5,402,400 A | | 3/1995 | Hamada et al. |
| 5,467,004 A | * | 11/1995 | Matsuo et al. ............... 318/807 |
| 5,654,840 A | * | 8/1997 | Patton et al. ................... 360/75 |
| 5,710,500 A | * | 1/1998 | Matsuo et al. ............... 318/799 |
| 5,737,483 A | * | 4/1998 | Inaji et al. ................... 388/805 |
| 5,773,938 A | * | 6/1998 | Seong et al. ............. 360/73.08 |
| 5,844,743 A | | 12/1998 | Funches |
| 5,999,361 A | * | 12/1999 | Kim ........................ 360/78.09 |
| 6,052,252 A | * | 4/2000 | Kim ........................ 360/78.09 |

(Continued)

FOREIGN PATENT DOCUMENTS

EP    0 509 545 A    10/1992

(Continued)

*Primary Examiner*—Andrea Wellington
*Assistant Examiner*—Glenda P. Rodriguez
(74) *Attorney, Agent, or Firm*—McDermott Will & Emery LLP

(57) ABSTRACT

A disk storage apparatus including a position detection section for producing position error information corresponding to the current position of a head from servo information which has been previously recorded on a disk and is detected by the head, a position control section for producing position control information corresponding to the position error information, a voltage detection section for detecting a voltage generated in driving an actuator for positioning the head with respect to the disk, and for outputting a voltage signal, a disturbance estimation section for estimating the magnitude of a disturbance exerted on the head from the voltage signal by the voltage detection section and from a drive signal by a drive section of the actuator, and producing disturbance estimation information, a correction section for correcting the position control information by the position control section with the disturbance estimation information and producing the drive signal, and a disturbance monitor section for monitoring the disturbance estimation information, and prohibiting a record by the head if the disturbance estimation information exceeds an allowable range, wherein even if the head is largely dislocated from a target track due to a large shock or vibration at data recording, an erroneous erasing of the adjacent track can be prohibited.

14 Claims, 23 Drawing Sheets

U.S. PATENT DOCUMENTS

| | | | |
|---|---|---|---|
| 6,196,047 B1 * | 3/2001 | Carnegie et al. | 73/1.11 |
| 6,690,536 B1 * | 2/2004 | Ryan | 360/78.04 |
| 6,714,371 B1 * | 3/2004 | Codilian | 360/60 |
| 6,735,033 B1 * | 5/2004 | Codilian et al. | 360/60 |
| 6,754,025 B1 * | 6/2004 | Shepherd et al. | 360/73.03 |
| 6,903,896 B2 * | 6/2005 | Miyata et al. | 360/78.06 |
| 6,950,274 B2 * | 9/2005 | Inaji et al. | 360/78.14 |
| 6,982,848 B2 * | 1/2006 | Inaji et al. | 360/77.02 |

FOREIGN PATENT DOCUMENTS

| | | |
|---|---|---|
| JP | 63-286915 | 11/1988 |
| JP | 2-56783 | 2/1990 |
| JP | 5-12847 | 1/1993 |
| JP | 5-62385 | 3/1993 |
| JP | 9-231701 | 9/1997 |
| WO | WO 01/08138 A1 | 2/2001 |

* cited by examiner

FIG.3A
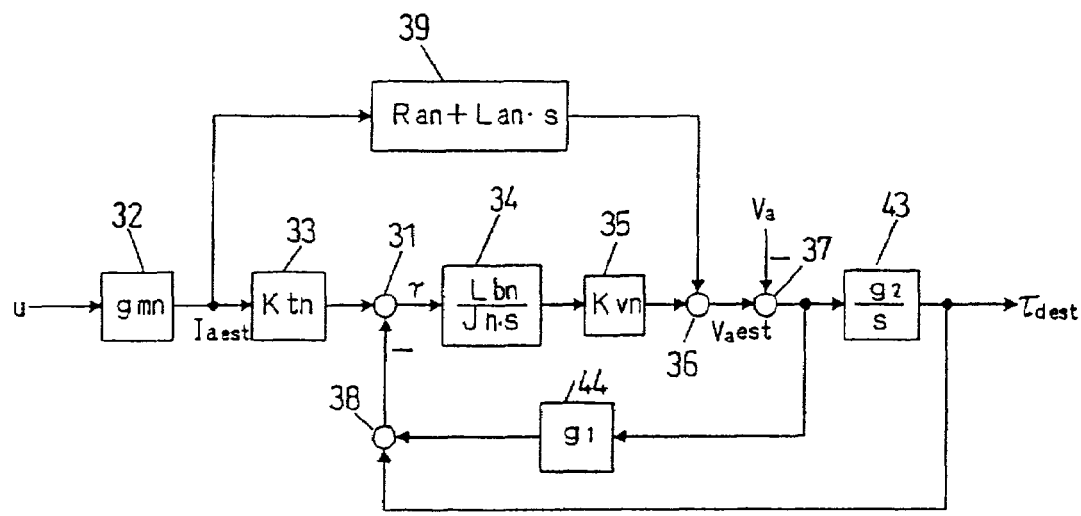
FIG.3B
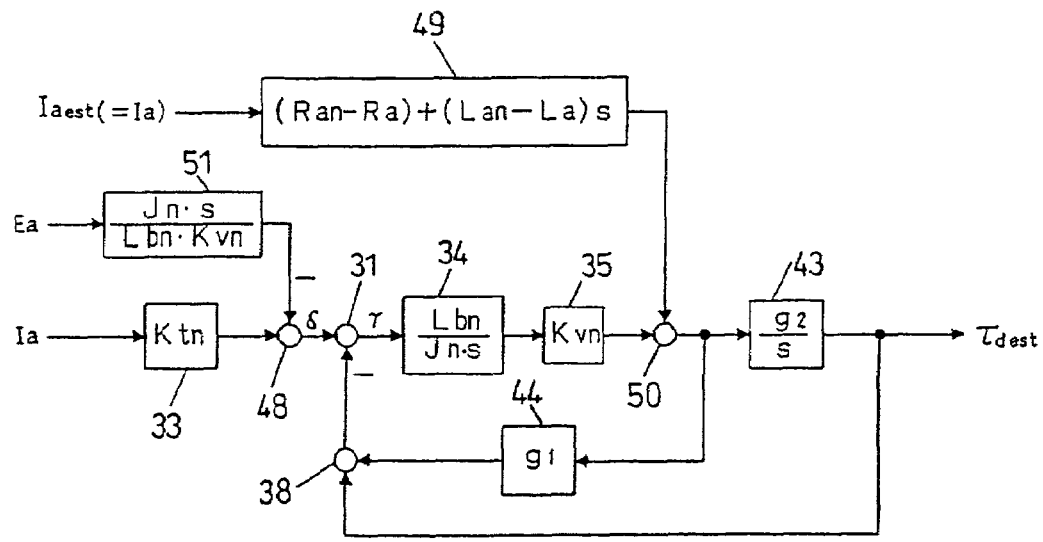
FIG.3C
$$\tau_d \longrightarrow \boxed{\frac{\omega_0^2}{s^2 + 2\zeta_0 \omega_0 s + \omega_0^2}}\; 52 \longrightarrow \tau_{dest}$$

DISK STORAGE APPARATUS

BACKGROUND OF THE INVENTION

1. Field of the Invention

The present invention relates to a disk storage apparatus in which an actuator positions a record/reproduce head to a target track of a disk-shaped record medium at a high accuracy, and to a technique of inhibiting a track dislocation of the head due to a disturbance such as a vibration and a shock to which the actuator is subject.

2. Description of the Related Art

In a disk storage apparatus for recording information, with the miniaturization and high record density of the apparatus, there has become severe the requirement of a high-accurate positioning of the record/reproduce head to the target track. Particularly a disk storage apparatus mounted on a personal data assistant such as a notebook computer is apt to be subject to a vibration or shock from the outside, thereby affecting largely a head positioning control system.

A disturbance affecting the head positioning accuracy includes a bearing friction of the actuator, an elastic force of a flexible print circuit (FPC) for connecting the actuator with a circuit board, and an inertia force acting on the actuator due to a shock or vibration exerted on the disk storage apparatus from the outside.

Based on a head position signal obtained from servo information having been previously recorded on the disk, there is produced a position error signal indicating a head position error with respect to the target track, whereby the head is positioning controlled so that the position error signal approaches zero. In this case, it may be considered that an external force is estimated by a drive signal of the actuator and the position error signal, and the estimated amount is incorporated into the control system, thereby compensate the external force.

However, the servo information on the disk is discrete one having a certain sampling period, and the head position signal is not a continuous signal. A control band capable of estimating the external force is affected by the sampling frequency, and has an upper limit. As a result, from the drive signal and the position error signal, the external force cannot be correctly estimated, so that the above-mentioned disturbance cannot be negated satisfactorily. That is, the head is difficult to be made to follow correctly the target track.

Particularly, when a vibration or shock exerted on the disk storage apparatus is excessive, only the rotational force developed by the actuator cannot inhibit the disturbance, so that the head is largely dislocated from the target track, whereby the data of the adjacent track can be destroyed. As a method of compensating the dislocation, it can be considered that an acceleration sensor is specially provided, and an acceleration signal detected by the sensor is used for the compensation. However, the provision of the acceleration sensor in the enclosure causes the miniaturization and reduction in price of the apparatus to be hindered.

SUMMARY OF THE INVENTION

Therefore, a primary object of the present invention is to provide a disk storage apparatus capable of position controlling the head at a high accuracy with respect to a target track by compensating a disturbance (such as a bearing friction, an elastic force of FPC, and an inertia force due to shock/vibration) without specially providing an acceleration sensor.

Other objects, features and advantages of the present invention will become apparent from the following description.

To achieve the above-mentioned object, as first solving means, the disk storage apparatus according to the present invention has a configuration including an actuator for positioning a head with respect to a disk; a drive section for driving the actuator; a position detection section for producing position error information corresponding to the current position of the head from servo information which has been previously recorded on the disk and is detected by the head; a position control section for producing position control information corresponding to the position error information by the position detection section; a voltage detection section for detecting a voltage generated in driving the actuator and outputting a voltage signal; a disturbance estimation section for estimating the magnitude of a disturbance exerted on the head from the voltage signal by the voltage detection section and a drive signal by the drive section, and producing disturbance estimation information; a correction section for correcting the position control information by the position control section with the disturbance estimation information by the disturbance estimation section and producing the drive signal; and a disturbance monitor section for monitoring the disturbance estimation information by the disturbance estimation section, and prohibiting a record by the head if the disturbance estimation information exceeds an allowable range.

This first solving means have a configuration in which the disturbance estimation section produces the disturbance estimation information based on the drive signal of the actuator and on the voltage signal generated in driving the actuator.

In the first solving means, to negate a disturbance such as a bearing friction, an elastic force exerted on the actuator and an inertia force due to vibration and shock to which the actuator is subject, the magnitude of the disturbance is estimated. In estimating the magnitude of the disturbance, two elements are used. One element employs a voltage signal obtained as a detection result by detecting of a voltage in driving the actuator. The other element is a drive signal in the drive section of the actuator. Here, the drive signal in the drive section may be the one inputted in the drive section, or the one outputted from the drive section. That is, there is provided the disturbance estimation section for estimating the magnitude of the disturbance, and with the disturbance estimation section, the disturbance estimation information is produced based on the voltage signal detected by the voltage detection section and on the drive signal in the drive section. The disturbance estimation information produced based on the voltage signal and the drive signal estimates correctly the magnitude of the disturbance exerted actually on the head. As a result, the magnitude of the disturbance (such as a bearing friction, an elastic force of FPC, and an inertia force due to shock or vibration) against the actuator can be correctly estimated. The disturbance related to the estimation represents the disturbance estimation information.

With the above-mentioned correctly-estimated disturbance estimation information, the position control information outputted by the position control section is corrected, the drive signal for negating the disturbance exerted on the actuator is produced, and using the drive signal, the actuator of the head is driven. That is, the disturbance exerted on the actuator can be compensated, so that even when the disturbance is exerted at the following motion toward the target track, the positioning control of the head to the target track can be implemented stably.

Meanwhile, when a vibration or a shock exerted on the disk storage apparatus is excessively large, only the rotational force developed by the actuator cannot inhibit the disturbance, so that the head is largely dislocated from the target track, whereby the data of an adjacent track can be destroyed. However, according to the first solving means, the disturbance monitor section monitors the disturbance estimation information produced by the disturbance estimation section, and prohibits a record on the disk by the head if the magnitude of the disturbance estimation information exceeds an allowable range. This allows the data of the track to be avoided from being destroyed even when a vibration or a shock exerted on the disk storage apparatus is excessive, thereby causing the head to be largely dislocated from the target track to reach the adjacent track. Then, to prevent such destroy, it is unnecessary to provide the acceleration sensor.

As second solving means, the disk storage apparatus according to the present invention has a configuration including: an actuator for positioning the head with respect to the disk; a drive section for driving the actuator; a position detection section for producing position error information corresponding to the current position of the head from servo information which has been previously recorded on the disk and is detected by the head; a position control section for producing position control information corresponding to the position error information by the position detection section; a voltage detection section for detecting a voltage generated in driving the actuator and outputting a voltage signal; a disturbance estimation section for estimating the magnitude of a disturbance exerted on the head from the voltage signal by the voltage detection section and from a drive signal by the drive section, and producing disturbance estimation information; a correction section for correcting the position control information by the position control section with the disturbance estimation information by the disturbance estimation section and producing a drive signal; and a disturbance monitor section for monitoring the disturbance estimation information by the disturbance estimation section, and prohibiting a record by the head if the disturbance estimation information exceeds an allowable range.

This second solving means have a configuration in which the disturbance estimation section produces the disturbance estimation information based on the drive signal generated in driving the actuator and on the position control signal generated from the position control section.

According to the second solving means, similarly to the first solving means, with the disturbance estimation information that the disturbance estimation section has correctly estimated from the voltage signal and the position control signal, the position control information outputted by the position control section is corrected, the drive signal for negating the disturbance exerted on the actuator is produced, and using the drive signal, the actuator of the head is driven. Therefore, even when the disturbance is exerted to the actuator at the following motion toward the target track, the positioning control of the head to the target track can be implemented stably. Further, the disturbance monitor section monitors the magnitude of the disturbance estimation information, and prohibits a record on the disk by the head if the magnitude of the disturbance estimation information exceeds an allowable range to such an extent that the head is largely dislocated due to an excessive vibration or shock, so that the data of the adjacent track can be avoided from being destroyed.

As apparent from the above-mentioned description, the position control section, the disturbance estimation section, the correction section, and the disturbance monitor section, which are components of the apparatus, may be configured by a hardware, or by a software.

As third solving means, the disk storage apparatus according to the present invention has a configuration including: an actuator for positioning the head with respect to the disk; a drive section for driving actuator; a voltage detection section for detecting a voltage generated in driving the actuator and outputting a voltage signal; a position detection section for producing position error information corresponding to the current position of the head from servo information which has been previously recorded on the disk and is detected by the head; a velocity/disturbance estimation section for estimating a head moving velocity and the magnitude of a disturbance exerted on the head from the voltage signal by the voltage detection section and from a drive signal in the drive section and producing velocity estimation information and disturbance estimation information; a position control section for producing position control information corresponding in principle to the position error information by the position detection section to produce position control information and adding the velocity estimation information by the velocity/disturbance estimation section to the position error information according to conditions to produce position control information; a correction section for correcting the position control information by the position control section with the velocity estimation information by the velocity/disturbance estimation section and producing a drive signal; and a disturbance monitor section for monitoring the velocity estimation information by the velocity/disturbance estimation section and when the velocity estimation information exceeds an allowable range, making valid the velocity estimation information with respect to the position error information in the velocity/disturbance estimation section.

This third solving means, compared to the above-mentioned first solving means, has a feature in the following point. In stead of the disturbance estimation section, there is provided the velocity/disturbance estimation section for estimating the magnitude of the head moving velocity in addition to the estimation of the magnitude of the disturbance, and with the velocity/disturbance estimation section, the disturbance estimation information and the velocity estimation information are produced based on the voltage signal detected by the voltage detection section and on the drive signal in the drive section. Concurrently estimating the head moving velocity in the course of the estimation of the magnitude of disturbance causes the head moving velocity to be also correctly estimated. Directly related to the estimation of the head moving velocity, the magnitude of disturbance can be estimated.

When the data for the disk is recorded/reproduced, the disturbance monitor section monitors the magnitude of the disturbance estimation information produced in the velocity/disturbance estimation section, and when the magnitude of the disturbance estimation information is within an allowable range, the position control section produces the position control information based on only the position error information by the position detection section. However, if the magnitude of the disturbance estimation information exceeds an allowable range, the position control section makes valid the velocity estimation information with respect to the position error information, and produces the position control information based on the position error information and the velocity estimation information. To produce the position control information, not only the position error information detected by the head, but also the velocity estimation information is used together. Therefore, even when an excessive vibration or shock exerted on the disk storage apparatus causes the head to be separated from the disk surface and thus servo information to be instantaneously not detected, a malfunction such as moving the head to the outer or inner periphery of the disk can be prevented. Thus, to prevent such malfunction, it is unnecessary to provide an acceleration sensor.

As fourth solving means, the disk storage apparatus according to the present invention has a configuration including: an actuator for positioning the head with respect to the disk; a drive section for receiving position control information and driving the actuator; a voltage detection section for detecting a voltage generated in driving the actuator and outputting a voltage signal; a position detection section for producing position error information corresponding to the current position of the head from servo information which has been previously recorded on the disk and is detected by the head; a velocity/disturbance estimation section for estimating a head moving velocity and the magnitude of a disturbance exerted on the head from the voltage signal by the position detection section and from a drive signal in the drive section and producing velocity estimation information and disturbance estimation information; a position control section for producing position control information corresponding in principle to the position error information by the position detection section and adding the velocity estimation information by the velocity/disturbance estimation section to the position error information according to conditions to produce position control information; and a disturbance monitor section for monitoring the disturbance estimation information by the velocity/disturbance estimation section and when the disturbance estimation information exceeds an allowable range, making valid the velocity estimation information with respect to the position error information in the position control section, wherein the drive signal is obtained based on the position control information by the position control section.

This fourth solving means are configured by the omission of the correction section in the above-mentioned third solving means.

This fourth solving means are configured such that as the drive signal of the actuator, only the position control information is used, and the disturbance estimation information is not composed. When a disturbance (such as a bearing friction, an elastic force of FPC, and an inertia force due to shock/vibration) exerted on the actuator is relatively small, it is unnecessary to correct the position control information with the disturbance estimation information, so that even only feedbacking the velocity estimation information to the position control section allows the track dislocation to be inhibited. In this case, there can be omitted the correction section for composing the position control information and the disturbance estimation information which section has been required for the third solving means, thereby leading to a simplified configuration. This is valid for the disk storage apparatus used in a condition in which an assumed disturbance is small.

As fifth solving means, the disk storage apparatus according to the present invention has a configuration including: an actuator for driving a head with respect to the disk; a drive section for driving the actuator; a voltage detection section for detecting a voltage generated in driving the actuator and outputting a voltage signal; a position detection section for producing position error information corresponding to the current position of the head from servo information which has been previously recorded on the disk and is detected by the head, a velocity/disturbance estimation section for estimating a head moving velocity and the magnitude of a disturbance exerted on the head from the voltage signal by the voltage detection section and from a drive signal in the drive section and producing velocity estimation information and disturbance estimation information; a position control section for corresponding in principle to the position error information by the position detection section and adding the velocity estimation information by the velocity/disturbance estimation section to the position error information according to conditions to produce position control information; a correction section for correcting the position control information by the position control section with the velocity estimation information by the velocity/disturbance estimation section and producing the drive signal; and a disturbance monitor section for monitoring the disturbance estimation information by the velocity/disturbance estimation section and when the velocity estimation information exceeds an allowable range, making valid the velocity estimation information with respect to the position error information in the position control section.

This fifth solving means have a configuration in which the velocity/disturbance estimation section produces the velocity estimation information and the disturbance estimation information based on the voltage signal generated in driving the actuator and on the position control information from the position control section.

According to the fifth solving means, similarly to the third solving means, when the magnitude of the disturbance estimation information is within an allowable range, the position control section produces the position control information based on only the position error information by the position detection section. However, if the magnitude of the disturbance estimation information exceeds an allowable range, not only the position error information detected by the head, but also the velocity estimation information are used together to produce the position control information, so that even in a condition in which an excessive vibration or shock exerted on the disk storage apparatus causes the head to be separated from the disk surface and thus servo information to be instantaneously not detected even without providing an acceleration sensor, a malfunction such as moving the head to the outer or inner periphery of the disk can be prevented.

As apparent from the above-mentioned description, the velocity/disturbance estimation section as a component of the apparatus may be configured by a hardware, or by a software.

As sixth solving means, the disk storage apparatus according to the present invention has a configuration including: an actuator for positioning the head with respect to the disk; a drive section for driving the actuator; a voltage detection section for detecting a voltage generated in driving the actuator and outputting a voltage signal; a position detection section for producing position error information corresponding to the current position of the head from servo information which has been previously recorded on the disk and is detected by the head; a position control section for producing position control information corresponding to the position error information by the position detection section; a velocity/disturbance estimation section for estimating a head moving velocity and the magnitude of a disturbance exerted on the head from the voltage signal by the voltage detection section and from a drive signal in the drive section and producing velocity estimation information and disturbance estimation information; a correction section for correcting the position control information by the position control section with the disturbance estimation information by the velocity/disturbance estimation section and adding the velocity estimation information by the velocity/disturbance estimation section to produce the drive signal; and a disturbance monitor section for monitoring the disturbance estimation information by the velocity/disturbance estimation section and when the disturbance estimation information exceeds an allowable range, making valid the velocity estimation information with respect to the position control information in the correction section.

The sixth solving means have a configuration in which the correction section receives the position control information, the disturbance estimation information and the velocity estimation information, and based in principle on the disturbance estimation information, corrects the position control information to produce the drive signal, and if the disturbance estimation information exceeds an allowable range, makes valid the velocity estimation information in the above-mentioned correction, and based on the disturbance estimation information and the velocity estimation information, corrects the position control information to produce the drive signal. The velocity estimation information is together used to produce the drive signal, so that similarly to the above-mentioned third solving means, even when an excessive vibration or shock exerted on the disk storage apparatus causes the head to be separated from the disk surface and thus servo information to be instantaneously not detected, a malfunction such as moving the head to the outer or inner periphery of the disk can be prevented. Thus, to prevent such malfunction, it is unnecessary to provide an acceleration sensor.

As seventh solving means, the disk storage apparatus according to the present invention has a configuration including: an actuator for positioning the head with respect to the disk; a drive section for driving the actuator; a voltage detection section for detecting a voltage generated in driving the actuator and outputting a voltage signal; a position detection section for producing position error information corresponding to the current position of the head from servo information which has been previously recorded on the disk and is detected by the head; a position control section for producing position control information corresponding to the position error information by the position detection section; a velocity/disturbance estimation section for estimating a head moving velocity and the magnitude of a disturbance exerted on the head from the voltage signal by the voltage detection section and from the position control information by the position control section and producing velocity estimation information and disturbance estimation information; a correction section for correcting the position control information by the position control section with the disturbance estimation information by the velocity/disturbance estimation section and adding the velocity estimation information by the velocity/disturbance estimation section according to conditions to produce the drive signal, and a disturbance monitor section for monitoring the disturbance estimation information by the velocity/disturbance estimation section and when the disturbance estimation information exceeds an allowable range, making valid the velocity estimation information with respect to the position control information in the correction section.

This seventh solving means, similarly to the above-mentioned fifth solving means, have a configuration in which the velocity/disturbance estimation section produces the velocity estimation information and the disturbance estimation information based on the voltage signal generated in driving the actuator and on the position control information from the position control section. The other configurations are similar to those of the above-mentioned sixth solving means. When the disturbance estimation information exceeds an allowable range, using the velocity estimation information in addition to the disturbance estimation information, position control information is corrected to produce the drive signal, so that similarly to the above-mentioned sixth solving means, even when an excessive vibration or shock exerted on the disk storage apparatus causes the head to be separated from the disk surface and thus servo information to be instantaneously not detected, a malfunction such as moving the head to the outer or inner periphery of the disk can be prevented. Thus, to prevent such malfunction, it is unnecessary to provide an acceleration sensor.

A preferred aspect in the above-mentioned first, third, fourth, sixth and seventh solving means is that the above-mentioned disturbance control section or velocity/disturbance estimation section is configured including the following components: a comparison section for receiving the voltage signal detected by the voltage detection section; a first multiplication section for multiplying the drive signal from the drive section by a first coefficient; a second multiplication section for multiplying the output of the comparison section by a second coefficient; a first integration section for integrating the output of the comparison section; and a second integration section for integrating a value obtained by subtracting the added value of the output of the second multiplication section and the output of the first integration section from the output of the first multiplication section. The comparison section compares the voltage signal with the output of the second integration section, and outputs the result to the second multiplication section and the first integration section. The second integration section produces the velocity estimation information therein.

The operation in this case is as follows. The output of the first multiplication section for receiving the drive signal exhibits drive torque estimation information corresponding to a drive torque exerted on the actuator. The output of the second integration section exhibits a feedback element to the voltage signal inputted from the voltage detection section. The output of the comparison section as a difference between the voltage signal and the feedback element from the second integration section is given to the first integration section and the second multiplication section. The output of the first integration section for integrating the above-mentioned difference exhibits the disturbance estimation information corresponding to a disturbance such as a friction exerted on the actuator from the bearing, an elastic force exerted on the actuator from FPC, and an inertia force exerted on the actuator due to shock or vibration. The output of the second multiplication section obtained by multiplying the above-mentioned difference by a predetermined coefficient is added to the disturbance estimation information. Then, a difference obtained by subtracting the above-mentioned added value from the drive torque estimation information is given to the second integration section. In the computing process of the second integration section, the velocity estimation information is produced. Thus, there is high the interlocking function of the disturbance estimation information with the velocity estimation information.

As apparent from the above-mentioned description, the comparison section, respective multiplication sections, and respective integration sections, which are components of the apparatus, may be configured by a hardware, or by a software.

As a result, the disturbance estimation information outputted from the first integration section is equivalent to the one estimating correctly the disturbance (such as a bearing friction, an elastic force of FPC, and an inertia force due to shock/vibration) exerted on the actuator. The feedforward control is implemented in a manner to negate the disturbance exerted on the actuator with the disturbance estimation information thus correctly computed, so that at the following operation, the disturbance exerted on the actuator can be compensated, and even when the fluctuation of the disturbance in the actuator at the following operating is large, the head positioning to the target track can be controlled stably, and the positioning accuracy can be improved.

A preferred aspect in the above-mentioned second or fifth solving means is that the disturbance control section or velocity/disturbance estimation section is configured including the following components: a comparison section for receiving the voltage signal detected by the voltage detection section; a first multiplication section for multiplying the drive signal from the drive section by a first coefficient; a second multiplication section for multiplying the output of the comparison section by a second coefficient; a first integration section for integrating the output of the comparison section; and a second integration section for integrating a value obtained by subtracting the output of the second multiplication section from the output of the first multiplication section. The comparison section compares the voltage signal with the output of the second integration section, and outputs the result to the second multiplication section and the first integration section.

The operation in this case is as follows. The output of the first multiplication section for receiving the position control information from the position control section exhibits drive torque estimation information corresponding to a drive torque exerted on the actuator. The output of the second integration section exhibits a feedback element to the voltage signal inputted from the voltage detection section. The output of the comparison section as a difference between the voltage signal and the feedback element from the second integration section is given to the first integration section and the second multiplication section. The output of the first integration section for integrating the above-mentioned difference exhibits the disturbance estimation information corresponding to a disturbance exerted on the actuator. A difference obtained by subtracting the output of the second multiplication section obtained by multiplying the above-mentioned difference by a predetermined coefficient from the drive torque estimation information is given to the second integration section.

As a result, the disturbance estimation information outputted from the first integration section is equivalent to the one estimating correctly the disturbance exerted on the actuator. The feedforward control is implemented in a manner to negate the disturbance exerted on the actuator with the disturbance estimation information thus correctly estimated, so that at the following operating, the disturbance exerted on the actuator can be compensated, and even when the fluctuation of the disturbance in the actuator at the following operating is large, the head positioning to the target track can be controlled stably, and the positioning accuracy can be improved. Further, the addition of the first integration section and the second multiplication section having been required in the preferred aspect of the second solving means is not required to compute, so that an addition computation section for addition can be omitted, thereby leading to a simplified configuration.

A preferred aspect in the above-mentioned first through seventh solving means is that the control band of the disturbance estimation section or velocity/disturbance estimation section is set at a value larger than that of the position control section.

Although the widening of the control band of a positioning control system is that the proportional gain is made larger, an upper limit exists by the sampling frequency of the sector servo of the disk storage apparatus or by the natural mechanical resonance frequency of the actuator. On the contrary, the disturbance estimation section or the velocity/disturbance estimation section is not affected by the sampling frequency of the sector servo of the disk storage apparatus. Therefore, in the disturbance estimation section or the velocity/disturbance estimation section, the control band can be set at a value higher than that of the positioning control system. As a result, over a higher control range, the head can be made to correctly follow the target track.

The present invention can be also applied to an optical disk storage apparatus, a magneto-optical disk storage apparatus and the like in addition to a magnetic disk storage apparatus.

BRIEF DESCRIPTION OF THE DRAWINGS

These and other objects as well as advantages of the invention will become clear by the following description of preferred embodiments of the invention with reference to the accompanying drawings, wherein:

FIG. 3A is a block diagram for explaining the disturbance estimation operation of a disturbance estimation section of the first embodiment of the present invention;

FIG. 3B is a block diagram obtained by equivalent transforming the block diagram of FIG. 3A;

FIG. 3C is a block diagram collectively expressing the block diagram of FIG. 3A;

In all these figures, like components are indicated by the same numerals.

DETAILED DESCRIPTION OF THE PREFERRED EMBODIMENTS

With reference to drawings, preferred embodiments of the present invention will be explained hereinafter.

First Embodiment

Figure 1:
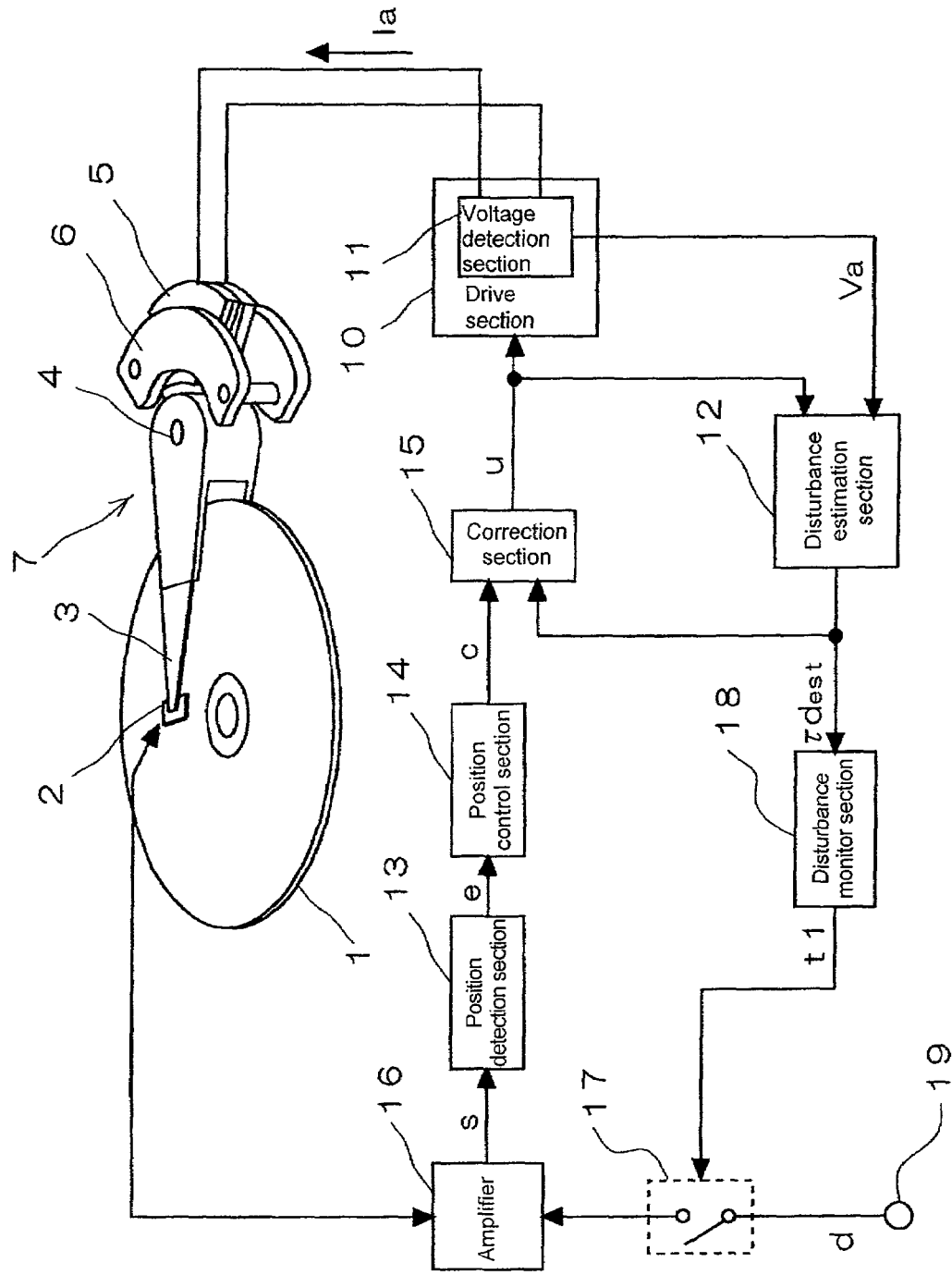
FIG. 1 is a block diagram showing a configuration of a magnetic disk storage apparatus according to a first embodiment of the present invention.

In FIG. 1, the numeral 1 indicates a magnetic disk rotated by a spindle motor (not shown); the numeral 2, a magnetic head for recording/reproducing data for the disk 1; and the numeral 3, a head arm which moves the head 2 to a target track on the disk 1 by pivoting the head 2 mounted on the one end of the arm 3 around a bearing 4. The numeral 5 indicates a drive coil provided on the rear end of the arm 3; and the numeral 6, a stator (yoke) in which a magnet (a permanent magnet, not shown) is arranged on the surface opposite to the drive coil 5. The stator 6 consists through a gap of a pair of opposite yokes, and within the gap, the above-mentioned magnet is fixed to at least one of the yokes. The interaction between the magnetic flux generated by the magnet arranged on the stator 6 and the magnetic field produced by the current conducted through the drive coil 5 causes the arm 3 to be subject to a rotational force. An actuator 7 is configured by the arm 3, the bearing 4, the drive coil 5 and the stator 6.

The numeral 10 indicates a drive section; and the numeral 11, a voltage detection section, which is included in the drive section 10, detects a voltage generated across the drive coil 5, and outputs a voltage signal Va. The numeral 12 indicates a disturbance estimation section which estimates a disturbance torque exerted on the arm 3 from the voltage signal Va outputted by the voltage detection section and from a drive signal u as an input of the drive section 10, and outputs a disturbance estimation signal $\tau d_{est}$. A signal s read from the head 2 is amplified at an amplifier 16 and inputted into a position detection section 13. A position signal of the track, which has been previously recorded as servo information on respective sectors of the disk 1, is read by the head 2, and amplified at the amplifier 16. The position detection section 13 detects a current position of the head 2 from the position signal read by the head 2, and produces a position error signal e indicating a difference from a target position r of the target track. A position control section 14 receives the position error signal e produced at the position detection section 13, amplifies and phase compensates the signal, and produces a position control signal c. The numeral 15 indicates a correction section which receives the position control signal c from the position control section 14 and the disturbance estimation signal $\tau d_{est}$ from the disturbance estimation section 12, and correction computes the position control signal c by the disturbance estimation signal $\tau d_{est}$, and then outputs the drive signal u to the drive section 10. The drive section 10 is configured such that it conducts a drive current Ia to the drive coil 5 in response to the inputted drive signal u, pivots the arm 3 about the bearing 4 as a center, rotationally moves the head 2 mounted on the top end of the arm 3, and positions at a high accuracy the head 2 to the target track formed by narrow track pitches in order to record/reproduce data on the disk 1. The numeral 18 indicates a disturbance monitor section into which the disturbance estimation signal $\tau d_{est}$ produced by the disturbance estimation section 12 is inputted. The disturbance monitor section 18 outputs a switching signal t1 to a record prohibit switch 17 when the magnitude of the disturbance estimation signal $\tau d_{est}$ exceeds a predetermined value of allowable range, and turns off the switch 17. A data signal d inputted into a data input terminal 19 is inputted through the switch 17 into the amplifier 16, and amplified at the amplifier 16 when the switch 17 is closed, and then recorded as data on the disk 1 by the head 2. The amplifier 16 is connected bidirectionally to the head 2. When the switch 17 is turned off, the writing of the data signal d onto the disk 1 by the head 2 is prohibited.

Each of the drive section 10, the voltage detection section 11, the disturbance estimation section 12, the position detection section 13, the position control section 14, the disturbance monitor section 18, and the switch 17 may be configured by a hardware such as an analog circuit, or a software.

Using FIG. 2, the operation of a positioning control system will be explained hereinafter.

A portion 30 surrounded with a single-dot chain line in the figure is a block of the disturbance estimation section 12. Similarly, a portion 47 surrounded with a single-dot chain line in the figure is a block of correction section 15. In FIG. 2, the symbol s indicates Laplace operator. In FIG. 2, hold elements by the sampling of the sector servo are omitted to simplify the explanation.

Figure 2:
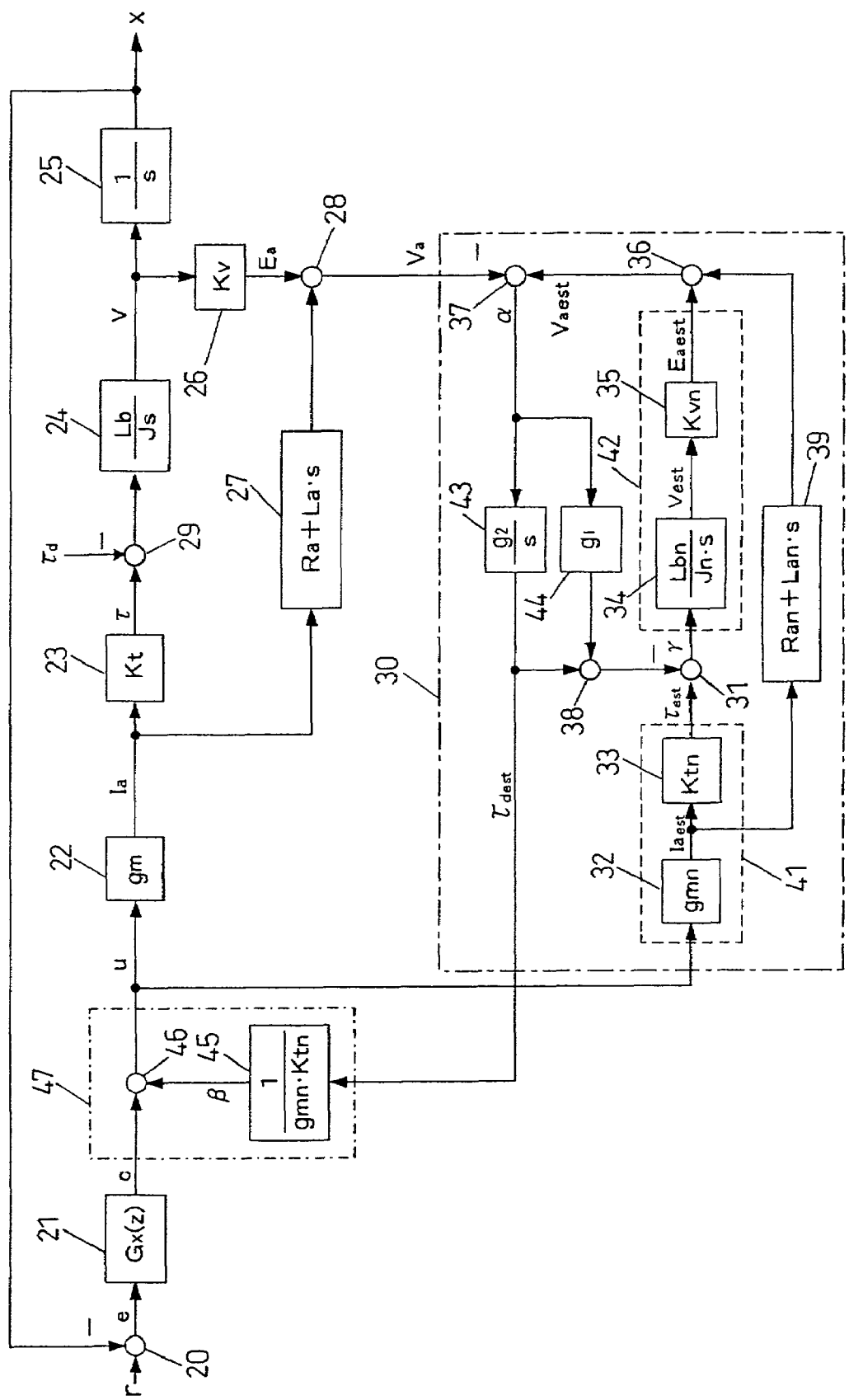
FIG. 2 is a block diagram showing the whole configuration of a positioning control system of the first embodiment of the present invention.

In FIG. 2, expressing the current track position detected by the head 2 as x, the position error signal e with respect to the target track position r is expressed by formula 1, which position error signal e is obtained at a comparison section 20.

$$e = r - x \quad \text{Formula 1}$$

The position control section 14 expressed by a block 21 in FIG. 2 applies a digital filter processing of a transfer function Gx (z) to the position error signal e outputted from the comparison section 20, produces the position control signal c, and outputs it to the correction section 15 expressed by a block 47. The positioning control system is applied with a normal PID control, and the transfer function of the position control section 14 can be expressed by formula 2:

$$Gx(z) = K_x \left\{ 1 + a_d(1 - z^{-1}) + a_i \frac{z^{-1}}{1 - z^{-1}} \right\} \quad \text{Formula 2}$$

Here, the symbol $z^{-1}$ indicates a one-sample delay, and the symbol Kx indicates a proportional gain of the positioning control system. The coefficients $a_d$, $a_i$ indicate constants for expressing frequency characteristic, in which the coefficient ad is a derivative coefficient, while the coefficient $a_i$ is an integral coefficient. The position error signal e passes through an addition section 46, and becomes the drive signal u. The drive signal u is converted from the voltage signal to a gm-time current signal at the drive section 10 of a block 22 (the transfer function is gm), where the drive current Ia is outputted. In the actuator 7 expressed by a block 23, the drive current Ia is converted by a transfer function Kt to the drive torque τ by an interaction between the magnetic field produced by the drive current Ia and the above-mentioned magnetic flux of the stator 6. Here, the transfer function Kt is a torque constant of the actuator 7. A transfer function (Lb/J·s) of a block 24 expresses a transfer characteristic from the drive torque τ exerted on the arm 3 to a moving velocity v of the head 2. Here, the symbol J indicates an inertia moment of the arm 3, and the symbol Lb indicates a distance from the bearing 4 of the arm 3 to the head 2. A block 25 indicates an integration section, where the transfer function is expressed by 1/s, and the moving velocity v of the head 2 is converted to the current track position x.

In the voltage detection section 11 expressed by a block 26 and a block 27, the block 26 outputs an induced voltage Ea generated across the drive coil 5 by the rotation of the actuator 7, while the block 27 outputs a voltage drop (Ra+La·s)·Ia generated by the conduction of the drive current Ia into the drive coil 5, and outputs a terminal voltage of the actuator 7 as the voltage signal Va by adding the induced voltage and the voltage drop to each other at an addition section 28. That is, the relationship therebetween is as follows:

$$Va = Ea + (Ra + La \cdot s)Ia \quad \text{Formula 3}$$

Here, the symbol Ra indicates a coil resistance of the drive coil 5, and the symbol La indicates an inductance of the drive coil 5.

A disturbance τd exerted on the arm 3 such as a bearing friction of the actuator 7, an elastic force of FPC (flexible print circuit) connecting the actuator 7 with an electronic circuit board, and an inertia force received by the actuator 7 due to shock or vibration exerted on the disk storage apparatus from the outside can be expressed as a form inputted into the front stage of the block 24 at a comparison section.

The portion 30 surrounded with a single-dot chain line in FIG. 2 is a block diagram of the disturbance estimation section 12, which block 30 includes a block 32 having the same transfer function $gm_n$ as the transfer function gm of the block 22 as the drive section 10, a block 33 having the same transfer function $Kt_n$ as the transfer function Kt of the block 23 as the actuator 7, a block 34 having the same transfer function $Lb_n/J_n \cdot s$ as the transfer function Lb/J·s of the block 24, a block 35 having the same transfer function $Kv_n$ as the transfer function Kv of the block 26 as the voltage detection section 11, and a block 39 having the same transfer function $Ra_n + La_n \cdot s$ as the transfer function Ra+La·s of the block 27. The first multiplication section is configured by the combination of the block 32 and the block 33; the second multiplication section, by a block 44; the first integration section, by a block 43; and the second integration section, by the combination of the block 34 and the block 35. Here, respective constants with the suffix "n" in the block 30 indicate nominal values, and variables with the suffix "est" indicate estimates.

The drive signal u inputted into the block 22 is also inputted into the block 32 constituting the disturbance estimation section 12, and a multiplication of $gm_n \cdot Kt_n$ times the drive signal u in the block 32 and the block 33 causes the same drive torque estimation signal $\tau_{est}$ as the drive torque τ exerted on the arm 3 to be obtained.

In FIG. 2, a velocity estimation signal Vest is outputted from the block 34. In the block 35, an induced voltage estimation signal $Ea_{est}$ obtained by increasing the velocity estimation signal $v_{est}$ by Kvn times is added to a voltage drop $(Ra_n + La_n \cdot s) \cdot Ia_{est}$ generated by the conduction of an estimation current $Ia_{est}$ at an addition section 36, and from the addition section 36, a voltage estimation signal $Va_{est}$ is outputted. The voltage estimation signal $Va_{est}$ is inputted into a comparison section 37 and is compared with the voltage signal Va actually detected. A resultant error signal $\alpha (= Va_{est} - V_a)$ is inputted into the first integration section expressed by the block 43 and the second multiplication section expressed by the block 44. The first integration section 43 integrates the error signal α, and outputs a disturbance estimation signal $\tau d_{est}$ for disturbance. The error signal α is inputted into the second multiplication section expressed by the block 44, and increased by g1 times, and then added to an addition section 38. The output of the addition section 38 is inputted into a subtraction section 31, where a resultant value γ obtained by subtracting the output of the addition section 38 from the drive torque estimation signal $\tau_{est}$ outputted from the block 33 is outputted to the block 34.

A coefficient g1 of the block 44 and a coefficient g2 of the block 43 are constants for stabilizing the operation of the disturbance estimation section 12, the detail of which will be described later.

In FIG. 2, a block 47 surrounded with a single-dot chain line is a block diagram of the correction section 15. A block 45 included in the correction section 15 produces a correction signal β to the drive section 10 required to make the arm 3 generate a drive force having a magnitude equivalent to the disturbance estimation signal $\tau d_{est}$ by increasing the disturbance estimation signal $\tau d_{est}$ by $1/(gm_n \cdot Kt_n)$ times. The correction signal β is added to the position control signal c at an addition section 46.

With reference to FIG. 3, the operation of the disturbance estimation section 12 of the block 30 will be explained hereinafter.

FIG. 3A is a block diagram obtained by rewriting the block 30 of FIG. 2, and shows the transfer from the input of the drive signal u to the output of the disturbance estimation signal $\tau d_{est}$. FIG. 3B is a block diagram obtained in the block diagram of FIG. 3A by transfer moving equivalently the input position (at the comparison section 37) of the voltage signal Va based on the formula 3, thereby transforming the block diagram of FIG. 3A. Here, to simplify the explanation, assuming that the value gm of the block 22 is equal to the value $gm_n$ of the block 32 in FIG. 2 as shown in the following formula, the drive current Ia $(=gm \cdot u)$ is considered to be equal to the estimation current $Ia_{est}$ $(=gm_n \cdot u)$.

$$g_m = g_{mn} \qquad \text{[Formula 4]}$$

Noting the first and second terms of the formula 3, by increasing the magnitude of the first term Ea by $J_n \cdot s / Lb_n \cdot Kv_n$ times, the first term Ea can move equivalently the input position of the comparison section 37 of FIG. 3A to the input position of a subtraction section 48 shown in FIG. 3B. The second term $(Ra+La \cdot s) \cdot Ia$ of the formula 3 can be included in the block 39 of FIG. 3A to be expressed as shown in a block 49 of FIG. 3B.

Noting the subtraction section 48 of FIG. 3B, the value δ as the output of the subtraction section 48 is expressed as shown in the formula 5:

$$\delta = K_{tn} \cdot I_a - \frac{J_n \cdot s}{L_{bn} \cdot K_{vn}} E_a \qquad \text{Formula 5}$$

Then, noting the comparison section, and the blocks 24, 26 of FIG. 2, there exists a relationship as shown in the formula 6:

$$E_a = \frac{L_b \cdot K_v}{J \cdot s}(K_t \cdot I_a - \tau d) \qquad \text{Formula 6}$$

Here, to simplify the formula 6, assuming the terms as follows:

$$Kt = Ktn \qquad \text{Formula 7}$$

$$\frac{L_b \cdot K_v}{J} = \frac{L_{bn} \cdot K_{vn}}{J_n} \qquad \text{Formula 8}$$

and substituting the formula 6 in the formula 5, the formula 5 is transformed as shown in the formula 9:

$$\delta = \tau d \qquad \text{Formula 9}$$

That is, the value δ as the output of the subtraction section 48 is equal to the disturbance τd exerted on the arm 3.

Therefore, determining a transfer function from the disturbance τd exerted on the arm 3 to the disturbance estimation signal $\tau d_{est}$, the function is obtained as shown in the formula 10:

$$\tau d_{est} = \frac{\frac{Lbn}{Jn} \cdot Kvn \cdot g2}{s^2 + \frac{Lbn}{Jn} \cdot Kvn \cdot g1 \cdot s + \frac{Lbn}{Jn} \cdot Kvn \cdot g2} \cdot \tau d \qquad \text{Formula 10}$$

From the formula 10, the disturbance estimation section 12 is understood that the actual disturbance τd can be estimated in a secondary delay system from the drive signal u and the voltage signal Va by the loop in the block 30 surrounded with a single-dot chain line of FIG. 2.

Here, expressing the natural angular frequency (estimated angular frequency) of the secondary delay system as ωo and the damping factor as ζo, the constants g1 and g2 to stabilize the operation of the disturbance estimation section 12 are expressed by the following formulas 11 and 12, respectively:

$$g1 = 2\zeta o \cdot \omega o \cdot \frac{J_n}{L_{bn} \cdot K_{vn}} \qquad \text{Formula 11}$$

$$g2 = \omega o^2 \cdot \frac{J_n}{L_{bn} \cdot K_{vn}} \qquad \text{Formula 12}$$

Here, setting the estimated angular frequency ωo at a value higher than a position control band fc, and selecting the damping factor as ζo as 0.7 through 1, the actual disturbance τd such as a bearing friction, an elastic force and an inertia force can be correctly estimated by the disturbance estimation section 12.

Transforming the formula 10 by the use of the formulas 11 and 12, the following formula is obtained:

$$\tau d_{est} = \frac{\omega o^2}{s^2 + 2\zeta o \cdot \omega o \cdot s + \omega o^2} \cdot \tau d \qquad \text{Formula 13}$$

That is, the block diagram of the disturbance estimation section 12 of FIG. 3A can be simplified as shown in a block 52 of FIG. 3C.

With reference to FIG. 4, the operation of the correction section shown in the block 47 will be explained in detail hereinafter.

The block 47 of a portion surrounded with a single-dot chain line of FIG. 4 indicates the block of the correction section 15. The block 45 outputs the correction signal β obtained by increasing the disturbance estimation signal $\tau d_{est}$ by $1/(gm_n \cdot Kt_n)$ times to the addition section 46. That is, by increasing the disturbance estimation signal $\tau d_{est}$ by $1/(gm_n \cdot Kt_n)$ times, the correction signal β required to make the actuator generate a drive force having a magnitude equivalent to the disturbance estimation signal $\tau d_{est}$ is outputted to the addition section 46. Further, the correction signal β is increased $gm_n \cdot Kt_n$ times by the blocks 22 and 23, so that the disturbance estimation signal $\tau d_{est}$ is previously increased $1/(gm_n \cdot Kt_n)$ times to match the magnitude with each other.

Concluding the above explanation, it can be said that the disk storage apparatus of the fist embodiment is configured such that the disturbance estimation signal $\tau d_{est}$ is made to exert the actuator in a manner to negate the disturbance τd due to a bearing friction of the actuator 7, an elastic force of FPC connecting the actuator 7 with an electronic circuit board, an inertia forces exerted on the actuator 7 by a shock or vibration exerted on the disk storage apparatus from the outside, and the like.

Figure 4A:
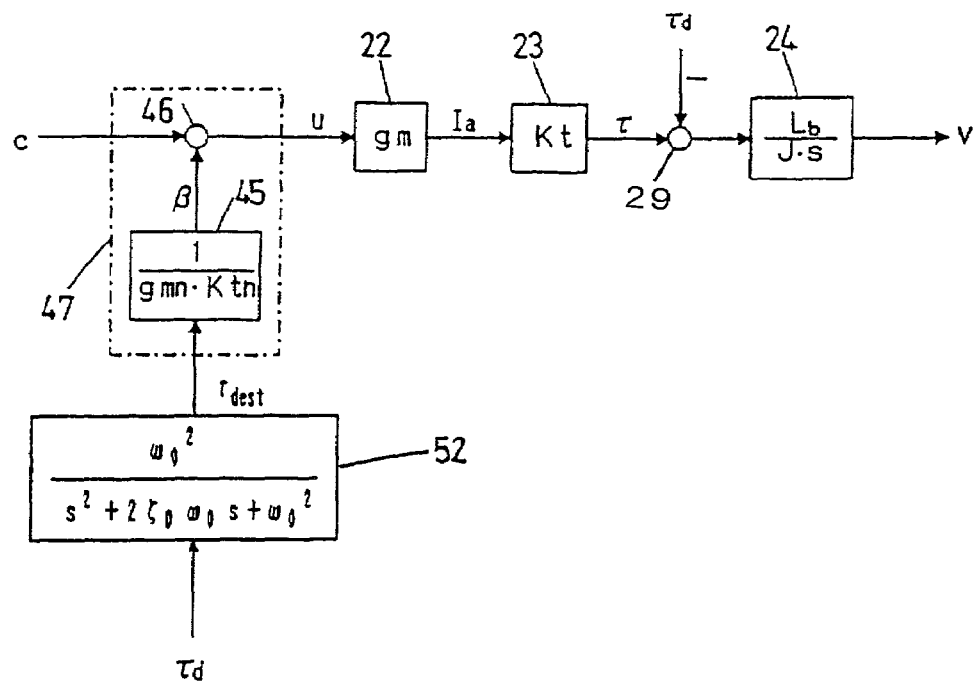
FIG. 4A is a block diagram for explaining an operation of inhibiting a disturbance exerted on the magnetic disk storage apparatus of the first embodiment of the present invention.
Figure 4B:
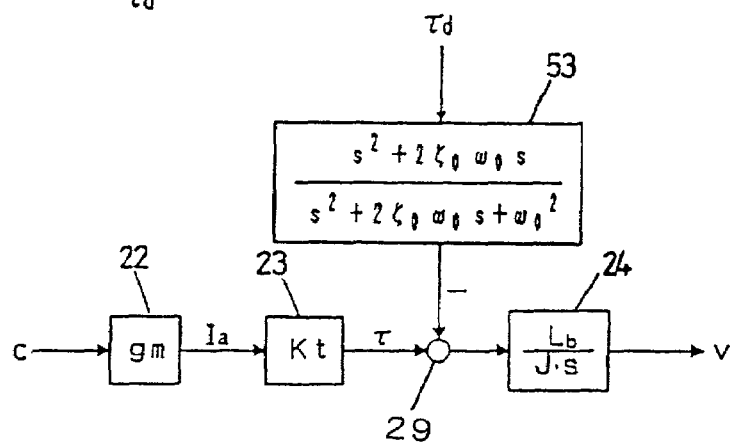
FIG. 4B is a block diagram obtained by equivalent transforming the block diagram of FIG. 4A.

FIG. 4A is a block diagram obtained by picking portions from the addition section 46 to the comparison section 29, the block 24 related to the operation of the correction section 15 from the block diagram of FIG. 2. FIG. 4B is a block diagram in which the disturbance τd exerted on the comparison section 29 and the one exerted on a block 52 are integrated into one disturbance τd. Components having the same function as those in the block diagram of FIG. 2 are indicated by the same symbols to omit a duplicated explanation.

In the block diagram of FIG. 4A, the block 52 is equivalent to the block 52 of FIG. 3C, and has a transfer function expressed by the formula 10.

Therefore, from FIG. 4B, the disturbance τd exerted on the arm 3 from the outside can be considered to be exerted through a filter expressed by a transfer function of the formula 14 on the head positioning control system.

$$G_d(s) = 1 - \frac{\omega_o^2}{s^2 + 2\zeta_o \cdot \omega_o \cdot s + \omega_o^2}$$
$$= \frac{s^2 + 2\zeta_o \cdot \omega_o \cdot s}{s^2 + 2\zeta_o \cdot \omega_o \cdot s + \omega_o^2}$$

Formula 14

Figure 5:
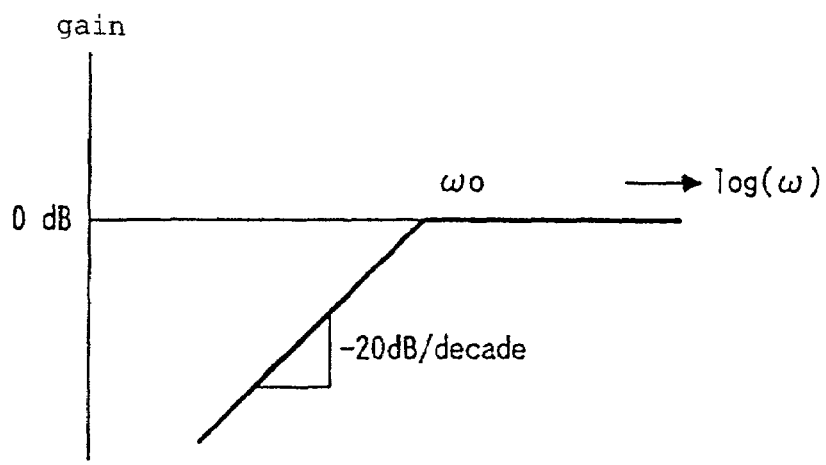
FIG. 5 is a cut-off frequency characteristic graph for a disturbance exerted on the magnetic disk storage apparatus of the first embodiment of the present invention.

FIG. 5 shows the frequency characteristic of a transfer function Gd (s) expressed by the formula 14 as a polygonal line approximation. From the frequency characteristic of the transfer function Gd (s) shown in FIG. 5, at an angular frequency lower than the angular frequency ωo, the gain is 0 dB or less, a damping ratio of −20 dB/decade. The decade means ten times. That is, from FIG. 5, transfer function Gd (s) has a low-pass cut-off filter characteristic capable of inhibiting a frequency lower than the angular frequency ωo.

That is, the disk storage apparatus of the first embodiment is configured such that even when the disturbance τd due to a bearing friction, an elastic force, an inertia force or the like is exerted on the actuator 7, the disturbance τd is estimated by the disturbance estimation section 12, and controlled in a manner to negated the disturbance τd exerted from the outside with the disturbance estimation signal $\tau d_{est}$. Therefore, the disturbance τd exerted from the outside acts as if the disturbance τd is exerted through a filter having the cut-off frequency characteristic of the formula 14 and FIG. 5 on the head positioning control system.

Therefore, at a frequency lower than the angular frequency ωo, the primary low-pass cut-off characteristic can inhibit the disturbance due to a bearing friction of the actuator 7, an elastic force of FPC connecting the actuator 7 with an electronic circuit board, an inertia forces exerted on the actuator 7 by a shock or vibration exerted on the disk storage apparatus from the outside, and the like.

That is, even when a vibration or a shock is applied to the apparatus to cause the disturbance τd to be exerted on the actuator 7, the disturbance τd is estimated by the disturbance estimation section 12, and controlled in a manner to negated the disturbance τd exerted from the outside, so that there is an effect as if the disk storage apparatus is provided with a mechanical vibration-proof mechanism.

Using FIG. 6, the disturbance inhibiting effect of the disturbance estimation section 12 will be explained in more detail hereinafter.

Figure 6A:
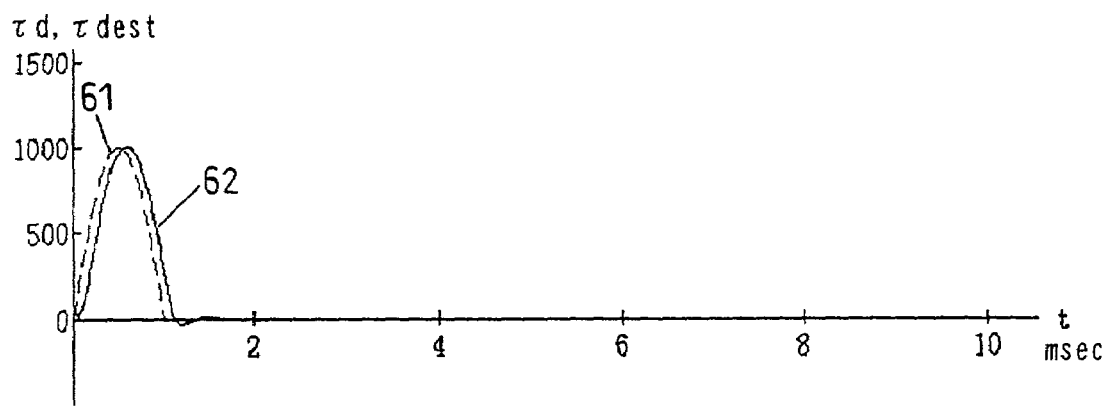
FIG. 6A is a waveform chart showing the fluctuation of a disturbance exerted on the magnetic disk storage apparatus of the first embodiment of the present invention and a disturbance estimation signal outputted from a disturbance estimation section with respect to time.

FIG. 6A shows a waveform 61 (shown by the broken line) of the disturbance τd due to an inertia force exerted on the actuator 7 and a waveform 62 of the disturbance estimation signal $\tau d_{est}$ outputted by the disturbance estimation section 12 when a half sine wave-shaped rotational shock with the maximum angular acceleration dωo/dt of 1000 radian/sec² is exerted on the disk storage apparatus from the outside. Expressing an inertia moment about the bearing 4 of the actuator 7 as 1 g·cm², the maximum value of the disturbance τd becomes as follows:

$$\tau d_{max} = J \cdot \frac{d\omega_o}{dt}$$

Formula 15

Here, selecting the values of an estimation frequency fo (ωo=2πfo) and a damping factor ζ0 for determining control parameters of the numerals 11 and 12 as 3 kHz and 1, respectively, and setting the control band of the position control system at 400 Hz, a simulation has been performed.

The disturbance estimation section 12 estimates the disturbance τd exerted on the actuator 7 from the drive signal u as the input of the drive section 10 and from the voltage signal Va outputted by the voltage detection section 11, and outputs the disturbance estimation signal $\tau d_{est}$ substantially similar to the actual disturbance τd, though a little time delay exists.

Figure 6B:
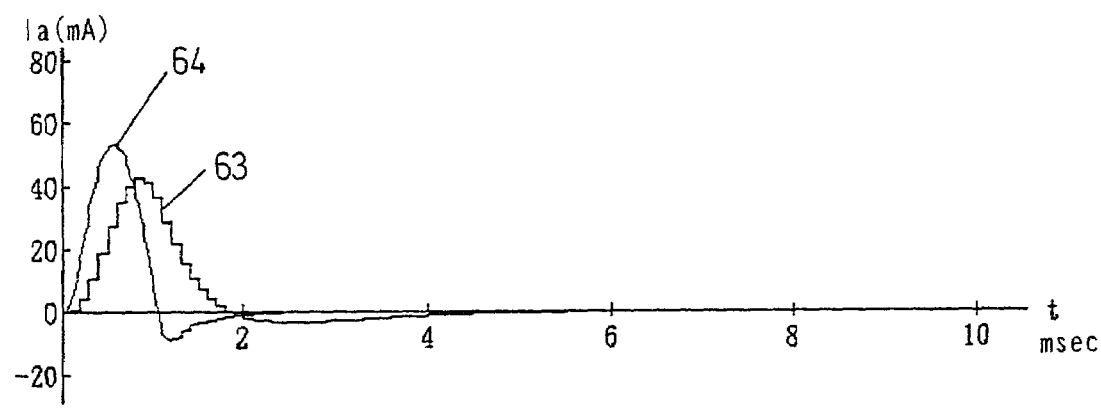
FIG. 6B is a waveform chart of a drive current with respect to time in a case where the disturbance estimation signal outputted from the disturbance estimation section of the first embodiment of the present invention is not inputted into a correction section.

FIG. 6B shows a waveform 64 of the drive current Ia when the disturbance estimation signal $\tau d_{est}$ has been exerted on the actuator 7 in a manner that the disturbance estimation signal $\tau d_{est}$ outputted by the disturbance estimation section 12 is inputted into the correction section 15 to negate a fluctuation due to the disturbance τd, and shows a simulation result of a waveform 63 of the drive current Ia when the disturbance estimation signal $\tau d_{est}$ is not inputted. The torque constant Kt of the actuator 7 is 23 dyn·cm/mA.

Servo information recorded on the disk 1 has been recorded on the disk in a discrete condition having a certain sampling period, so that the head position signal is not a continuous signal. Therefore, the control signal c of the position control section 14 for implementing digital processing is changed into a step-shaped one. As a result, the waveform of the drive current Ia of the actuator 7 when the disturbance estimation signal $\tau d_{est}$ is not inputted into the correction section 15 becomes the same waveform as that of the control signal c, so that the waveform is changed into a step-shaped one as shown in the waveform 63 of FIG. 6B (Ia=gm·c=gm·u). The waveform 64 of the drive current Ia of the actuator 7 when the disturbance estimation signal $\tau d_{est}$ has been inputted into the correction section 15 is produced by adding the disturbance estimation signal $\tau d_{est}$ to the control signal c of the position control section 14 by the correction section 15, so that the time delay thereof from a point (t=0) when a rotational shock is exerted on the disk storage apparatus is smaller than that of the waveform 63 of FIG. 6B.

Figure 6C:
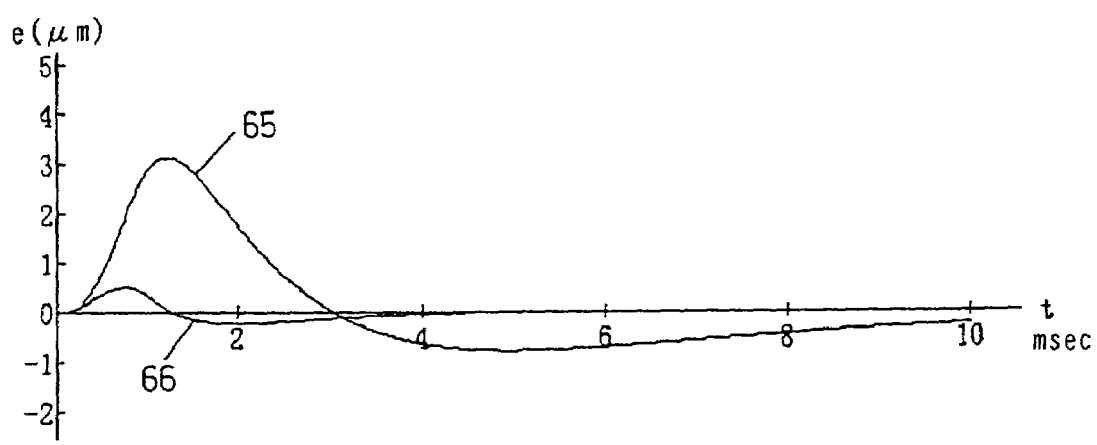
FIG. 6C is a waveform chart of a track error with respect to time in a case where the disturbance estimation signal outputted from the disturbance estimation section of the first embodiment of the present invention is inputted into the correction section to negate the fluctuation of a disturbance.

FIG. 6C shows a waveform 66 of the position error signal e when the disturbance estimation signal $\tau d_{est}$ has been exerted on the actuator 7 in a manner that the disturbance estimation signal $\tau d_{est}$ outputted by the disturbance estimation section 12 is inputted into the correction section 15 to negate a fluctuation due to the disturbance $\tau d$, and shows a simulation result of a waveform 65 of the position error signal e when the disturbance estimation section 12 is not applied. Even when a semi-sine wave-shaped rotational shock is exerted on the disk storage apparatus from the outside, if the disturbance estimation section 12 is applied, the position error signal e is not largely fluctuated as with the waveform 65, so that compared to the waveform 65 when the disturbance estimation section 12 is not applied, the disturbance inhibiting effect has been improved.

As a result, the disk storage apparatus of the first embodiment correctly detects the disturbance due to an inertia force exerted on the actuator by a vibration or a shock exerted from the outside by the use of the disturbance estimation section 12 to allow a track dislocation due to the disturbance to be inhibited, whereby the head 2 is controlled at a high accuracy to be positioned to the target track. Therefore, the tracking control stable against the shock or vibration can be implemented, thereby improving the reliability of the disk storage apparatus.

Further, the magnetic disk storage apparatus is often installed on portable computers, which portable ones are apt to be subject to a vibration or a shock from the outside. For such a vibration or a shock, the disk storage apparatus of the present invention estimates the disturbance $\tau d$ exerted from the outside by the disturbance estimation section 12, and controls the disturbance $\tau d$ to be negated with the disturbance estimation signal $\tau d_{est}$.

Meanwhile, the drive force the actuator 7 can generate to dislocate the head 2 has a limit by itself, so that the drive force cannot be inhibited satisfactorily depending on the magnitude of a vibration or a shock exerted on the disk storage apparatus, and thus the head 2 can be largely dislocated from the target track. At that moment, recording data by the head 2 can destroy data on the adjacent disk.

Thus, the apparatus is configured such that the disturbance estimation signal $\tau d_{est}$ produced by the disturbance estimation section 12 is monitored at all times by the disturbance monitor section 18, and when the signal exceeds a predetermined level, the record prohibition switch 17 is turned off, whereby the recording of data by the head 2 is prohibited.

In a normal condition in which a large vibration or shock is not exerted, the switch is closed. Therefore, the data signal d to be recorded is amplified by the amplifier 16, and the data is recorded on the target track by the head 2.

When the absolute value of the disturbance estimation signal $\tau d_{est}$ produced by the disturbance estimation section 12 is higher than a threshold limit value, a "H" level switching signal t1 is outputted from the disturbance monitor section 18. Here, the threshold limit value is a value corresponding to a vibration or a shock with a degree that the head 2 is largely dislocated from the target track. The switching signal t1 outputted from the disturbance monitor section 18 has been inputted into the control section of the switch 17, and when the switch t1 is the "H" level, the switch 17 is opened.

Even if a large vibration or shock, when data is recorded by the disk storage apparatus, causes the head 2 to be largely dislocated from the target track and moved to the adjacent track, the switch 17 is opened, so that the recording by the head 2 is prohibited. Hence, the data on the adjacent track is not destroyed.

With such configuration, when the head 2 is largely dislocated from the target track, and thus can be moved to the adjacent track, the recording by the head 2 is prohibited, so that the data recorded on the adjacent track is not erased by mistake. The data not recorded need only to be written again thereafter.

While the above-mentioned disk storage apparatus has been configured such that the drive signal u outputted from the block 47 is inputted as one input signal to the disturbance estimation section 12, it is needless to say that the same effect can be obtained also by the use of the driving current Ia of the output of the drive section 10 outputted from the block 22 instead of the drive current u. In that case, in FIG. 2, the apparatus may be configured such that the driving current Ia from the block 22 is inputted into the block 33, and the block 32 maybe omitted.

Second Embodiment

Figure 7:
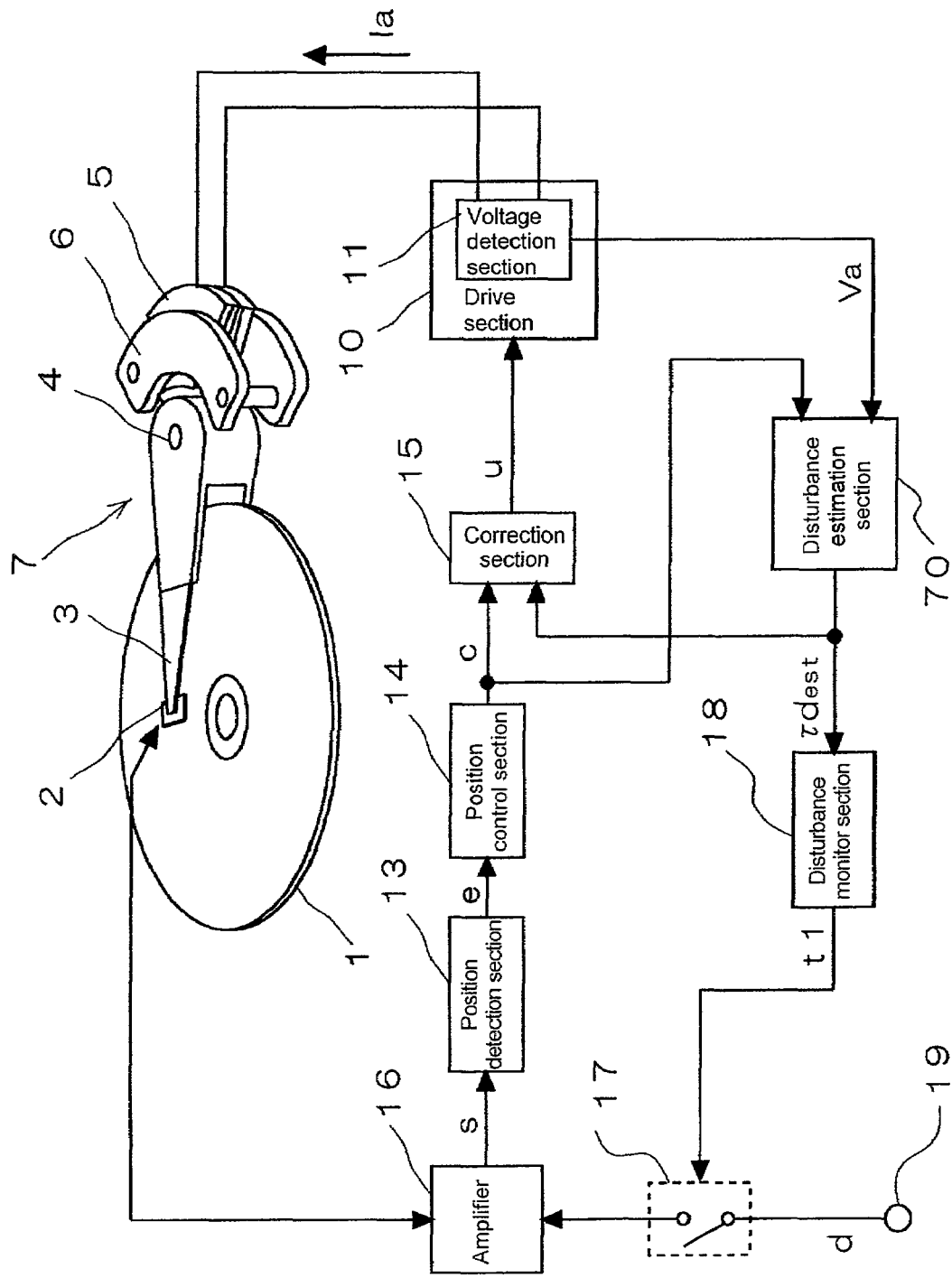
FIG. 7 is a block diagram showing a configuration of a magnetic disk storage apparatus according to a second embodiment of the present invention.

While the first embodiment of FIG. 1 has been configured such that the voltage signal Va and the drive signal u produced by the voltage detection section 11 are inputted into the disturbance estimation section 12, in the second embodiment of FIG. 7, the voltage signal Va produced by the voltage detection section 11 and the position control signal c produced by the position control section 14 are inputted into a disturbance estimation section 70.

The correction section 15, into which the position control signal c produced by the position control section 14 and the disturbance estimation signal $\tau d_{est}$ produced by the disturbance estimation section 70 are inputted, implements a correction computing, and then outputs the drive signal u to the drive section 10.

Figure 8:
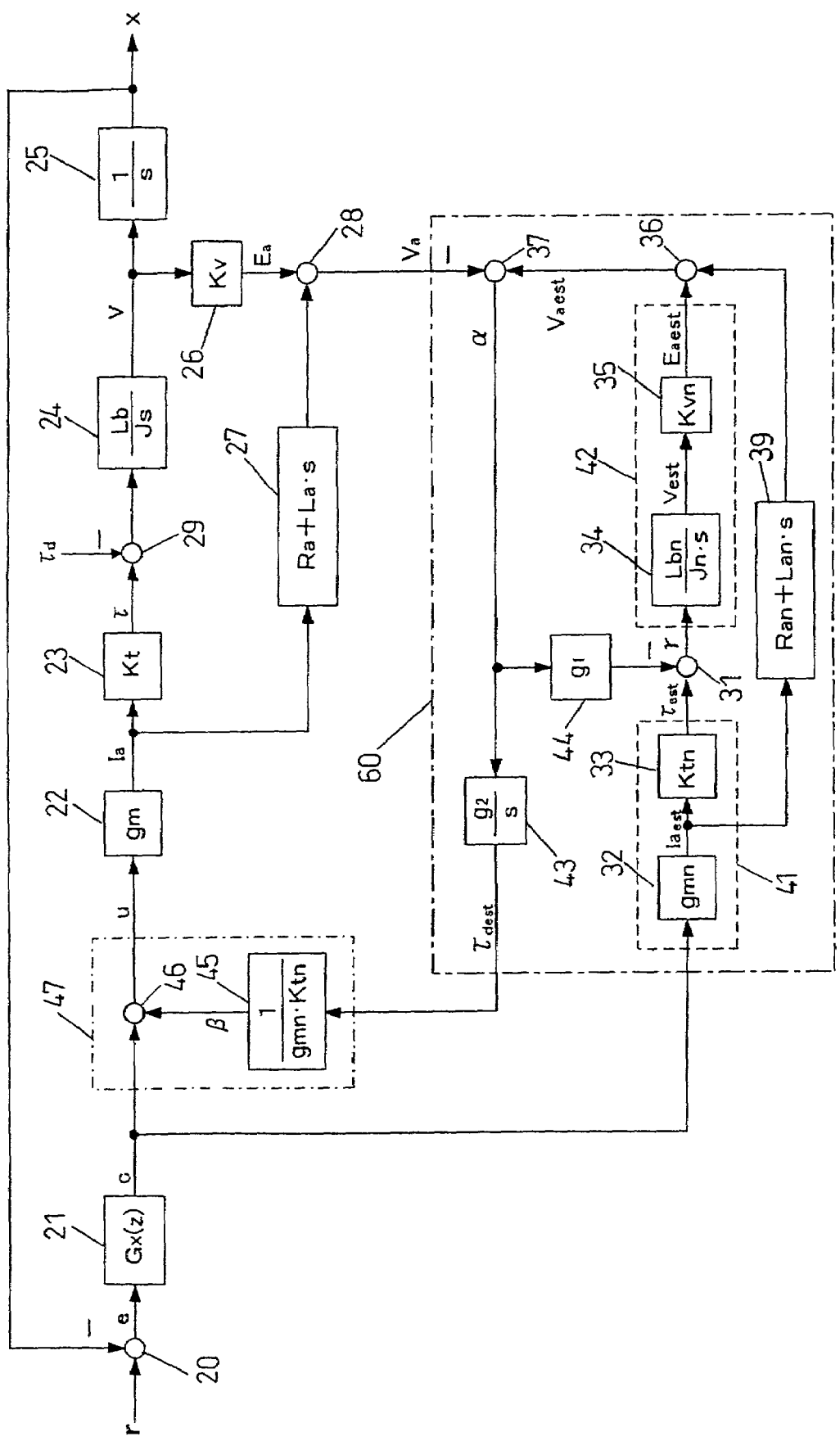
FIG. 8 is a block diagram showing the whole configuration of a positioning control system of the second embodiment of the present invention.

The block 60 surrounded with a single-dot chain line in FIG. 8 is a block diagram of the disturbance estimation section 70. Inputted into the disturbance estimation section 70 are the voltage signal Va produced by the voltage detection section 11 as the output of the addition section 28 and the position control signal c produced by the position control section 14 expressed by the block 21.

In the above-mentioned disturbance estimation section 12 of the first embodiment, the computing has been implemented as follows: A signal obtained by multiplying the coefficient g2/s of the block 43 of the first integration section, and a signal obtained by multiplying the coefficient g1 of the block 44 of the second multiplication section are added to each other at the addition section 38. A signal obtained by the addition and the disturbance estimation signal $\tau_{est}$ produced by multiplying the coefficient $gm_n \cdot Kt_n$ of the block 41 of the first multiplication section are inputted into the subtraction section 31. The signal γ obtained by the subtraction of the subtraction section 31 has been inputted into the block 42 of the second integration section. That is, the drive signal u to which the correction signal β is added has been inputted into the disturbance estimation section 12, so that the addition section 38 of FIG. 2 has been required.

However, the disturbance estimation section 70 of the second embodiment is configured such that the position control signal c is inputted before the correction signal β is added, so that the addition section 38 as shown in FIG. 2 is not required.

Compared to the operation of the disturbance estimation section 12 of the first embodiment, the operation of the disturbance estimation section 70 will be explained hereinafter.

First, in FIG. 2, expressing the input of the second integration section 42 constituting the disturbance estimation section 12 of the first embodiment as γ, by noting the subtraction section 31, the signal γ is expressed as follows:

$$\gamma = \tau_{est} - (\tau d_{est} + g_1 \cdot \alpha)$$ Formula 16

$$= g_{mm} \cdot K_{in} \cdot u - (\tau d_{est} + g_1 \cdot \alpha)$$

While by noting the addition section 46 of FIG. 2, the drive signal u is expressed by the formula 17:

$$u = c + \beta$$ Formula 17

$$= c + \frac{1}{g_{mn} \cdot K_m} \cdot \tau d_{est}$$

Therefore, from the formulas 16 and 17, the signal γ can be expressed by the formula 18:

$$\gamma = g_{mm} \cdot K_{tn} \cdot c - g_1 \cdot \alpha$$ Formula 18

Based on the formula 18, rewriting the block diagram of the disturbance estimation section 12 caused the block diagram of the disturbance estimation section 70 shown in FIG. 8 to be obtained. The position control signal c produced by the position control section 14 (block 21) is inputted into the multiplication section of the block 32, and the output of the block 32 is inputted into the multiplication section of the block 33. Hence, multiplying the position control signal c by the coefficient $gm_n \cdot Kt_n$ allows the disturbance estimation signal $\tau_{est}$ to be obtained. As a result, the disturbance exerted on the actuator 7 can be correctly detected by the disturbance estimation section 70.

On the other hand, the correction section 15 into which the disturbance estimation signal $\tau d_{est}$ is inputted operates in a similar manner to the first embodiment to negate the disturbance τd exerted on the actuator 7. That is, similarly to the first embodiment, the disturbance τd exerted from the outside acts as if it is exerted through a filter having a cut-off frequency characteristic of the formula 14 and FIG. 5 on the position control system.

The disturbance estimation section 70 configured similarly to the block 30 of FIG. 2 is not affected by the sampling frequency of the sector servo of the disk storage apparatus. Therefore, the control band of the disturbance estimation section 70 can be set at a level higher than the control band of the positioning control system.

Therefore, the disk storage apparatus of the second embodiment can inhibit the disturbance with the primary low-pass cut-off characteristic at a frequency lower than the angular frequency ωo. This allows a track dislocation due to the disturbance to be inhibited, whereby the head 2 is controlled at a high accuracy to be positioned to the target track. Therefore, the tracking control stable against the shock or vibration can be implemented, thereby improving the reliability of the disk storage apparatus.

The operation of the disturbance monitor section 18 and the record prohibition switch 17 is similar to that of the first embodiment. Other operations and action effects are similar to that of the first embodiment, so that the explanation will be omitted.

According to the disk storage apparatus of the second embodiment, the number of the addition sections required for the configuration of the disturbance estimation section 70 and the correction section 15 can be reduced compared to that of the first embodiment.

Thus, the number of the addition sections can be reduced, so that when the positioning control system is embodied with a hardware such as an analog circuit, the adjustment of such circuit can be simplified. Further, when the positioning control system is embodied with a software, the computing time delay by computing process can be shortened, thereby making higher the control band.

Third Embodiment

Figure 9:
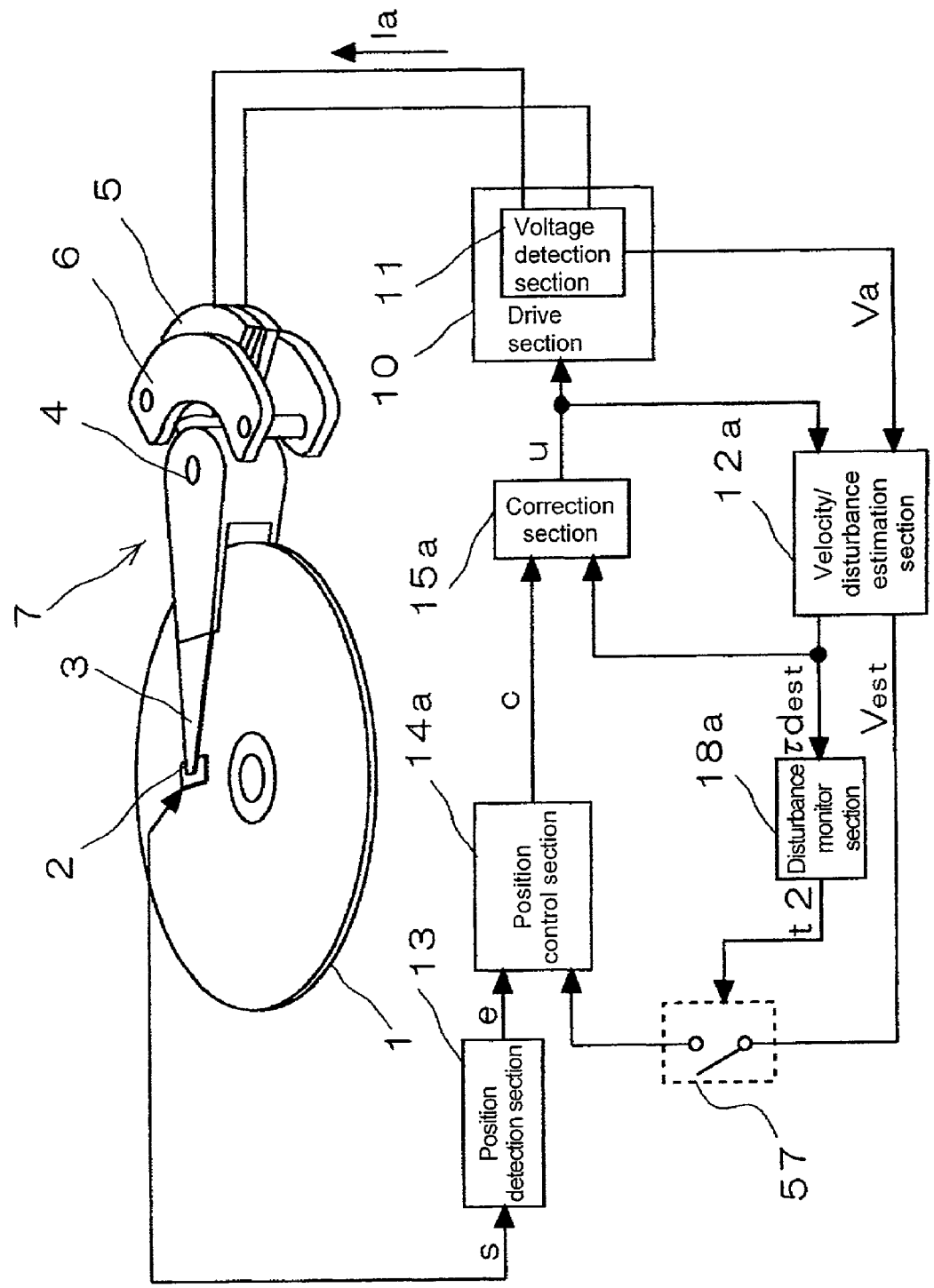
FIG. 9 is a block diagram showing a configuration of a magnetic disk storage apparatus according to a third embodiment of the present invention.

In the magnetic disk storage apparatus of the third embodiment shown in FIG. 9, a point different from the first embodiment of FIG. 1 is that instead of the disturbance estimation section 12, a velocity/disturbance estimation section 12a is provided, and a disturbance monitor section 18a is inserted between the velocity/disturbance estimation section 12a and a position control section 14a. The velocity estimation signal Vest from the disturbance monitor section 12a is given through a switch 57 to the position control section 14a. Although the amplifier 16 of the first embodiment is employed also in this embodiment, the graphical indication thereof is omitted.

In FIG. 9, the symbol 12a indicates a velocity/disturbance estimation section, which velocity/disturbance estimation section 12a estimates the disturbance torque τd exerted on the arm 3 from the voltage signal Va outputted by the voltage detection section 11 and from the drive signal u as the input of the drive section 10, and outputs the disturbance estimation signal $\tau d_{est}$, and at the same time, estimates the rotational velocity of the arm 3 and outputs the velocity estimation signal $v_{est}$.

The position control section 14a, into which the position error signal e produced by the position detection section 13 and the velocity estimation signal $v_{est}$ produced by the velocity/disturbance estimation section 12a are inputted, implements amplification and positional compensation, and produces the position control signal c. The symbol 15a indicates a correction section, into which the position control signal c of the position control section 14a and the disturbance estimation signal $\tau d_{est}$ of the velocity/disturbance estimation section 12a are inputted, and which implements correction computing, and then outputs the drive signal u to the drive section 10. The symbol 18a is a disturbance monitor section, into which the disturbance estimation signal $\tau d_{est}$ produced by the velocity/disturbance estimation section 12a is inputted. The disturbance monitor section 18a controls the switch 57 by the switching signal t2 according to the magnitude of the disturbance estimation signal $\tau d_{est}$. Normally, the switch 57 is turned off, and turned on when the magnitude of the disturbance estimation signal $\tau d_{est}$ exceeds a predetermined level.

Using FIG. 10, the operation of the positioning control system of the disk storage apparatus of the third embodiment will be explained hereinafter.

A portion 30a surrounded with a single-dot chain line in the figure is a block of the velocity disturbance estimation section 12a, while a portion 21a surrounded with a single-dot chain line in the figure is a block of the position control section 14a. Similarly, a portion 47 surrounded with a single-dot chain line is a block of the correction section 15a.

Figure 10:
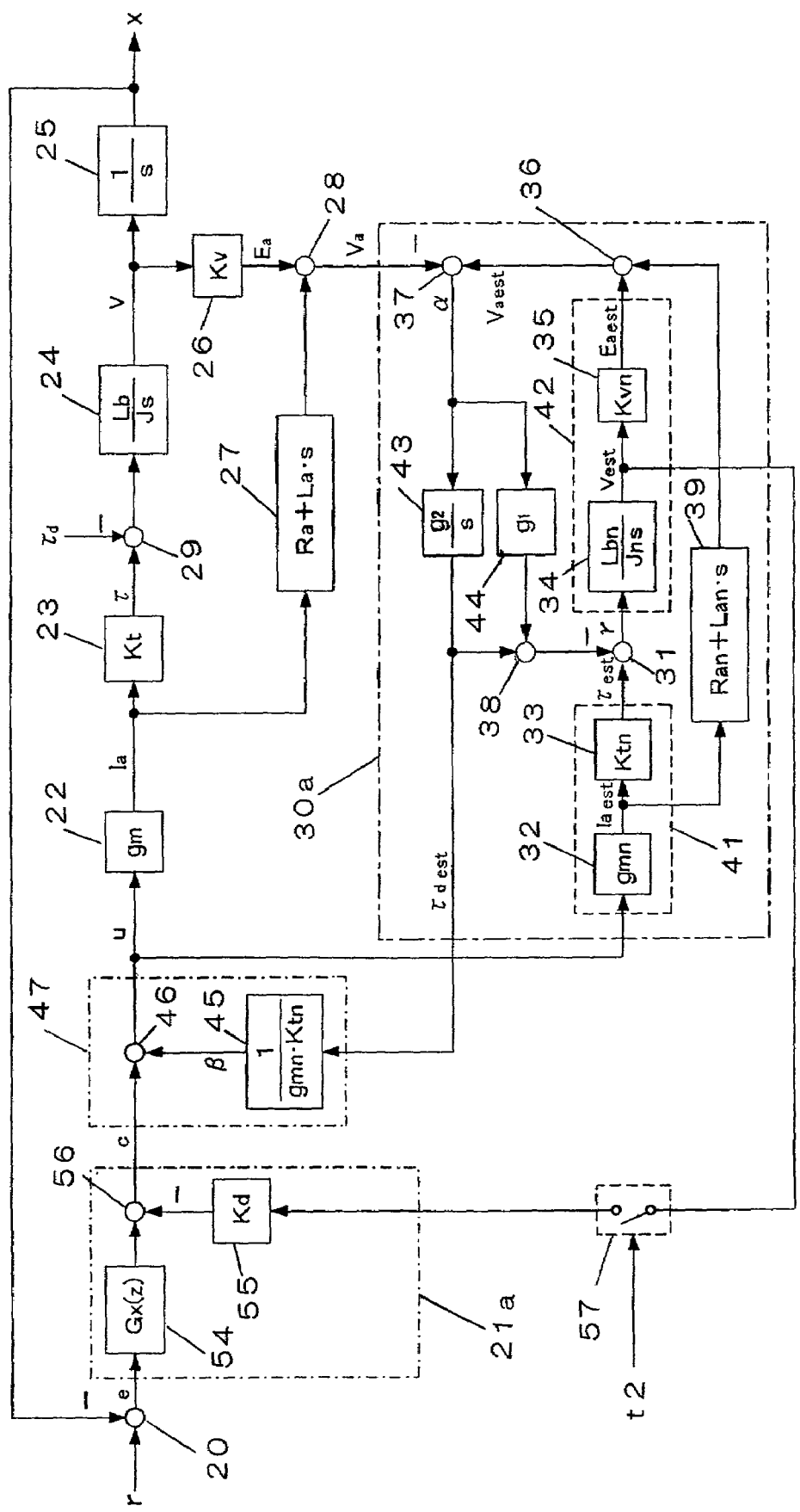
FIG. 10 is a block diagram showing the whole configuration of a positioning control system of the third embodiment of the present invention.

In FIG. 10, the above-mentioned formula 1 is established as with the first embodiment.

In FIG. 10, the block 21a surrounded with a single-dot chain line is a block diagram of the position control section 14a, into which the position error signal e and the velocity estimation signal $v_{est}$ from the velocity/disturbance estimation section 12a are inputted. The block 54 included in the block 21 indicating the position control section 14a applies the digital filter processing of a transfer function Gx (z) to the position error signal e outputted from the comparison section 20, and outputs the result to the subtraction section 56. The velocity estimation signal $v_{est}$ outputted from the block 30a is inputted through the switch 57 into the block 55. The block 55 increases the velocity estimation signal $v_{est}$ outputted from the block 30a by Kd times, and outputs the result to subtraction section 56. The subtraction section 56 subtracts the output of the block 55 from the output of the block 54, and produces the position control signal c.

In the block 54, the above-mentioned formula 2 is established as with the first embodiment.

The disturbance monitor section 18a monitors at all times the disturbance estimation signal $\tau d_{est}$ produced by the velocity/disturbance estimation section 12a, and in a normal condition in which the disturbance estimation signal $\tau d_{est}$ does not exceeds a predetermined level of an allowable range, and a large vibration or shock is not exerted, the switch 57 is opened. That is, when the disturbance estimation signal $\tau d_{est}$ produced by the block 30a is within the predetermined level, the switch 57 is opened by the switching signal t2 of the disturbance monitor section 18a, so that the position control signal c produced by the position control section 14a can be expressed by the formula 19:

$$c = Gx(z) \cdot e \qquad \text{Formula 19}$$

On the other hand, when the magnitude of the disturbance estimation signal $\tau d_{est}$ of the block 30a exceeds a predetermined level, a "H" level switching signal t2 is outputted from the disturbance monitor section 18a. Here, the threshold limit value is a value corresponding to a vibration or a shock with a degree that the head 2 is largely dislocated from the target track. When the switching signal t2 outputted from the disturbance monitor section 18a is at the "H" level, the switch 57 is closed. In this case, the position control signal c produced by the position control section 14a can be expressed by the formula 20:

$$c = Gx(z) \cdot e - K_d \cdot V_{est} \qquad \text{Formula 20}$$

Here, for convenience, this formula is shown as a relational expression in which discrete values and continuous values are mixedly present.

The position control signal c produced by the block 21a is outputted through the addition section 46 as the drive signal u.

The block 30a surrounded with a single-dot chain line in FIG. 10 indicates a block diagram of the velocity/disturbance estimation section 12a, which is different from the first embodiment in that the velocity estimation signal $v_{est}$ outputted from the block 34 in the block 42 of the second integration is connected to the switch 57.

The operation of the velocity/disturbance estimation section 12a of the block 30a is similar to that of the first embodiment explained in FIGS. 3 and 4.

Figure 11A:
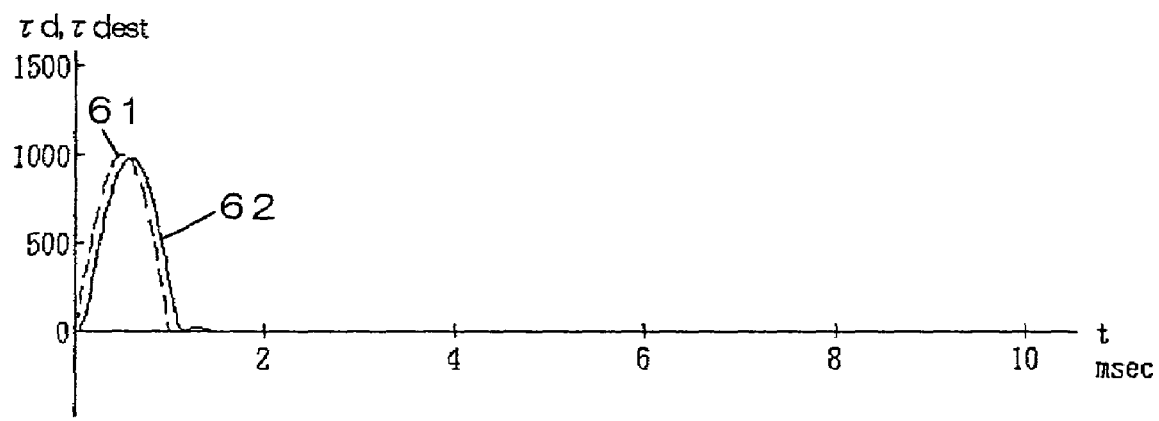
FIG. 11A is a waveform chart showing the fluctuation of a disturbance exerted on the magnetic disk storage apparatus of the third embodiment of the present invention and a disturbance estimation signal outputted from a velocity/disturbance estimation section with respect to time.
Figure 11B:
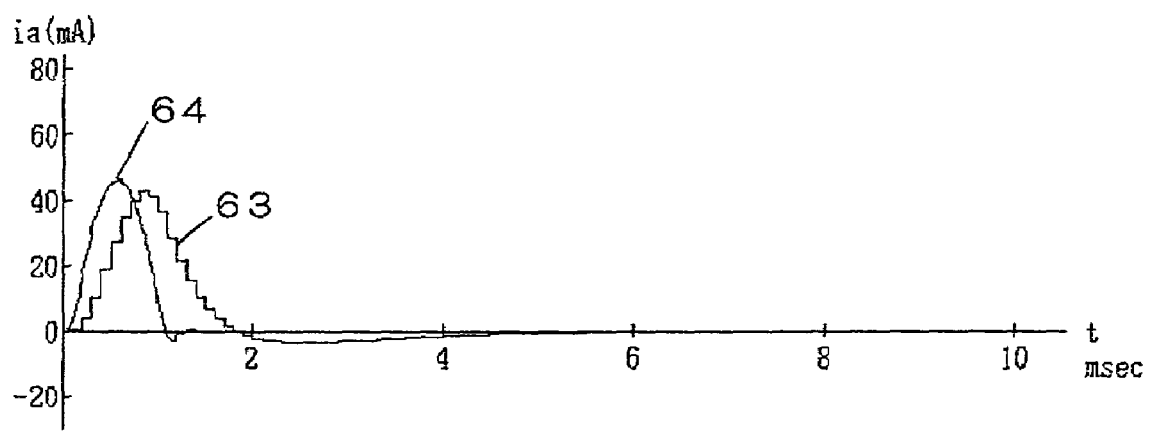
FIG. 11B is a waveform chart of a drive current with respect to time showing a difference between a case where the velocity/disturbance estimation section of the third embodiment of the present invention is applied, and a conventional case where the velocity/disturbance estimation section is not applied.
Figure 11C:
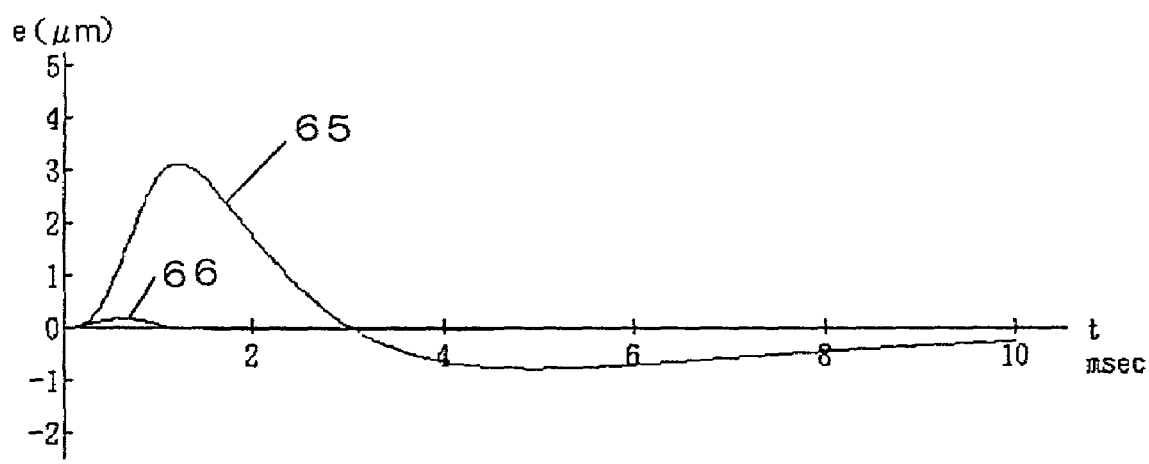
FIG. 11C is a waveform chart of a track error with respect to time showing a difference between a case where the velocity/disturbance estimation section of the third embodiment of the present invention is applied, and a conventional case where the velocity/disturbance estimation section is not applied.

Using FIG. 11, the disturbance inhibiting effect of the velocity/disturbance estimation section 12a in the disk storage apparatus of the third embodiment of the present invention will be explained in more detail. FIG. 11 shows a waveform chart of time-response to shock exerted on the disk storage apparatus of the present invention in which when the switch 57 is closed by the switching signal t2, the velocity estimation signal $v_{est}$ produced by the velocity/disturbance estimation section 12a is inputted through the switch 57 into the position control section 14a, and the disturbance estimation signal $\tau d_{est}$ produced by the velocity/disturbance estimation section 12a is inputted into the correction section 15a, as well as a waveform chart of time-response to shock exerted on the disk storage apparatus of prior art in which the velocity/disturbance estimation section 12a is not applied in order to compare therewith. FIG. 11 is similar to FIG. 6 for the first embodiment.

The disk storage apparatus of the third embodiment of the present invention, as with the first embodiment, can correctly estimate the disturbance by an inertia force and the like exerted on the actuator 7 due to a vibration or a shock from the outside by the use of the velocity/disturbance estimation section 12a. The disturbance $\tau d$ exerted on the actuator 7 can be controlled by inputting the disturbance estimation signal $\tau d_{est}$ thus obtained into the correction section 15a to negate the disturbance $\tau d$, so that the track dislocation can be inhibited, and the head 2 is controlled at a high accuracy in a manner to be positioned to the target track.

Further, in the disk storage apparatus of the third embodiment of the present invention, the velocity estimation signal $v_{est}$ produced by the velocity/disturbance estimation section 12a is inputted through the switch 57 into the position control section 14a, so that even when the actuator 7 is subject to an inertia force due to a vibration or a shock from the outside to forcedly move the head, a negative feedback is provided by the operation of the block 55 and the subtraction section 56 both constituting the block 21a of the position control section 14a, whereby the track dislocation of the head is inhibited. Further, to produce the position control signal c, not only the position control signal c detected by the head is used, but also the velocity estimation signal $v_{est}$ obtained by the velocity/disturbance estimation section 12a is used, so that even when a vibration or a shock caused the magnetic head to be separated from the disk surface and thus servo information to be instantaneously and correctly not detected, a malfunction such as moving the head to the outer or inner periphery of the disk can be prevented.

Therefore, the disk storage apparatus of the third embodiment of the present invention can implement a stable following control against the shock or vibration, thereby improving the reliability of the disk storage apparatus.

Generally, in the magnetic disk storage apparatus, the servo information for following is recorded on the disk surface by special device called a servo track writer (STW) after the apparatus is assembled. Therefore, the track on which the servo information is recoded does not develop basically an eccentricity from the rotational center. However, as a recent trend, rather than the recording of the servo information after the apparatus assembling, the incorporating of the disk on which the servo information has been previously recoded into the apparatus is often performed, thereby achieving a reduced cost of the apparatus. Using the time-response waveform of FIG. 12, there will be explained a case where the following operation of the magnetic head of the third embodiment is implemented in the disk storage apparatus in which the track becomes eccentric as described above. That is, there will be explained an effect that the feedback of the velocity estimation signal $v_{est}$ to the position control section 14a is implemented through the switch 57.

Figure 12A:
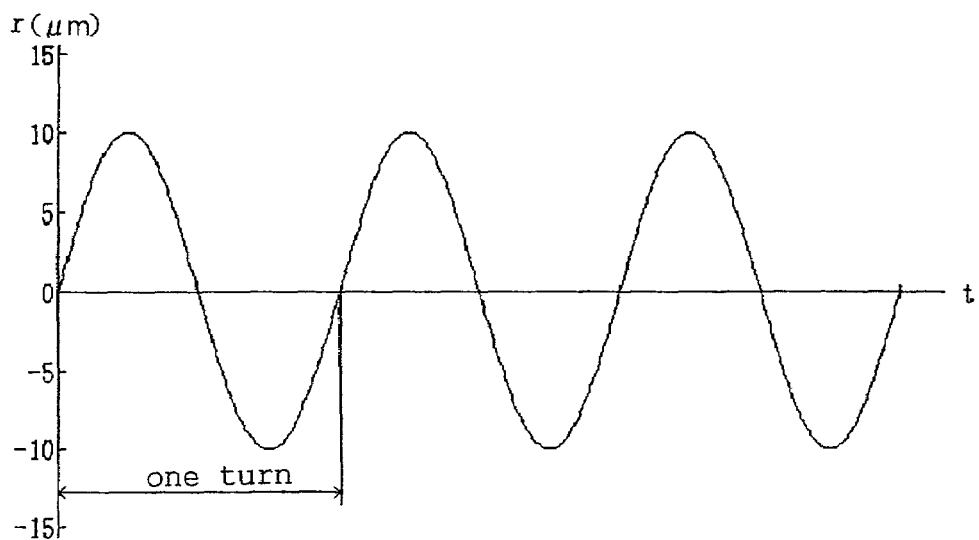
FIG. 12A is a waveform chart of a track eccentricity of the magnetic disk storage apparatus of the third embodiment of the present invention with respect to time.
Figure 12B:
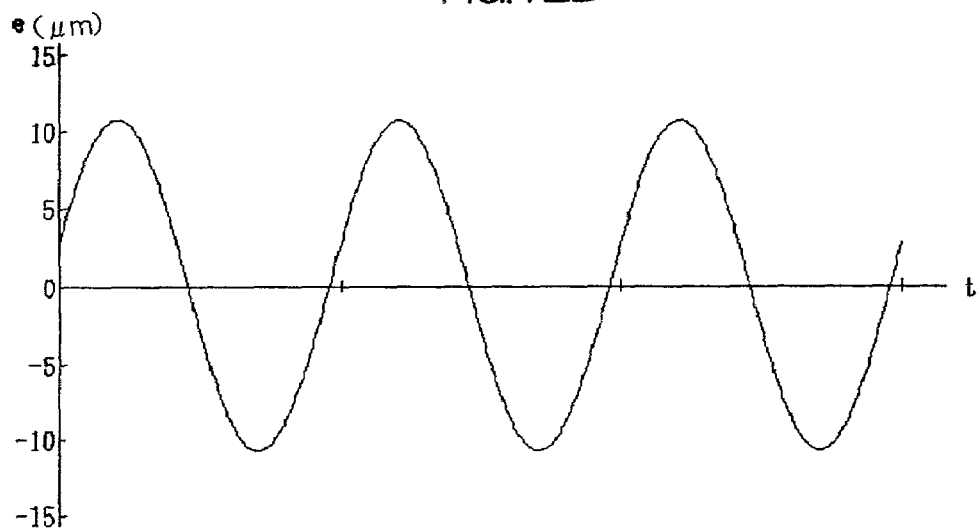
FIG. 12B is a waveform chart of an error signal with respect time in a condition in which a switch of the third embodiment of the present invention is normally closed.

FIG. 12A shows the eccentricity of the target track of the disk storage apparatus, when assuming a sine waveform to synchronize with the rotational period of the disk having the maximum eccentricity of 10 µm as an example, a simulation is performed. FIG. 12B shows the result of a simulation of the following error e when the velocity estimation signal $v_{est}$ is normally feedbacked supposing the switch 57 is not provided. In a condition in which with respect to the eccentricity of 10 µm, the following error when the magnitude of the disturbance estimation signal $\tau d_{est}$ is within an allowable range remains present about 10 µm, the magnetic head does not follow the target track.

Figure 12C:
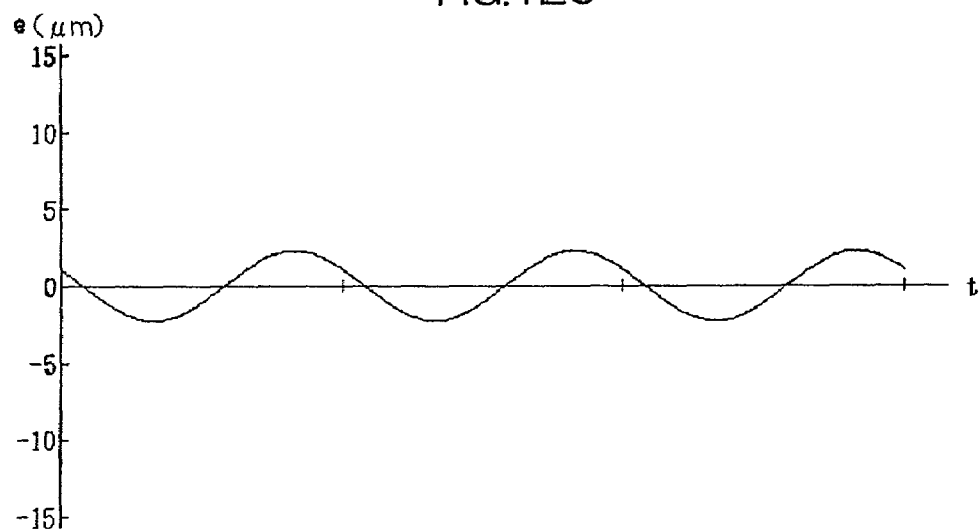
FIG. 12C is a waveform chart of an error signal with respect time in a condition in which a switch of the third embodiment of the present invention is opened to indicate the effect.

FIG. 12C shows the result of a simulation of the following error e in a condition in which the switch 57 is opened when the switch 57 is provided therebetween, and the magnitude of the disturbance estimation signal $\tau d_{est}$ is within an allowable range. With respect to the target track eccentricity of 10 µm, the following error is about 2 µm, so that the magnetic head follows the target track. This is an effect of the fact that the feedback is not implemented at all times, but is implemented through the switch.

In this manner, in the disk storage apparatus of the third embodiment of the present invention, the magnitude of the disturbance estimation signal $\mu d_{est}$ produced by the velocity/disturbance estimation section 12a is monitored at all times by the disturbance monitor section 18a, and when the magnitude of the disturbance estimation signal $\tau d_{est}$ produced by the velocity/disturbance estimation section 12a exceed a predetermined level, a "H" level switching signal t2 is outputted from the disturbance monitor section 18a. The apparatus is configured such that the switching signal t2 instantaneously closes the switch 57 to feedback the velocity estimation signal $v_{est}$ produced by the velocity/disturbance estimation section 12a to the position control section 14a (block 21a). Therefore, inputted through the switch 57 into the position control section 14a is the velocity estimation signal $V_{est}$ produced by the velocity/disturbance estimation section 12a, so that even if a large vibration or shock is exerted when the data is recorded/reproduced, the magnetic head will not largely dislocated from the target track. On the other hand, when the magnitude of the disturbance estimation signal $\tau d_{est}$ produced by the velocity/disturbance estimation section 12a is within the predetermined level, an "L" level switching signal t2 is outputted from the disturbance monitor section 18a. The apparatus is configured such that the switching signal t2 opens the switch 57 not to input the velocity estimation signal $v_{est}$ produced by the velocity/disturbance estimation section 12a into the position control section 14a. Therefore, not inputted into the position control section 14a is the velocity estimation signal $v_{est}$ produced by the velocity/disturbance estimation section 12a, so that the magnetic head can be made to follow correctly the target track.

While the above-mentioned disk storage apparatus of the third embodiment of the present invention has been configured such that the drive signal u outputted from the block 47 is inputted into the velocity/disturbance estimation section 12a as one input signal thereto, it is needless to say that a similar effect can be obtained also by the use of the drive current Ia outputted from the drive section 10 from the block 22 instead of the drive signal u. In this case, in FIG. 10, the apparatus may be configured in a manner to input the drive current Ia from the block 22 to the block 33, and the block 32 may be omitted.

Further, while in the above-mentioned third embodiment, the disturbance estimation signal $\tau d_{est}$ produced by the velocity/disturbance estimation section 12a has been inputted into the correction section 15a, and the velocity estimation signal $v_{est}$ has been inputted through the switch 57 into the position control section 14a, when a bearing friction exerted on the actuator 7, an elastic force of FPC, or an a vibration of shock from the outside is relatively small, the disturbance estimation signal $\tau d_{est}$ is not required to be inputted into the correction section 15a, and only the negative feedback of the velocity estimation signal $v_{est}$ to the position control section 14a allows the track dislocation of the head to be inhibited satisfactorily, and the correction section 15a can be omitted.

Fourth Embodiment

Using FIGS. 13 and 14, the disk storage apparatus according to the fourth embodiment of the present invention will be explained. Components having the same function as those in the above-mentioned third embodiment are indicated by the same symbols to omit a duplicated explanation.

Figure 13:
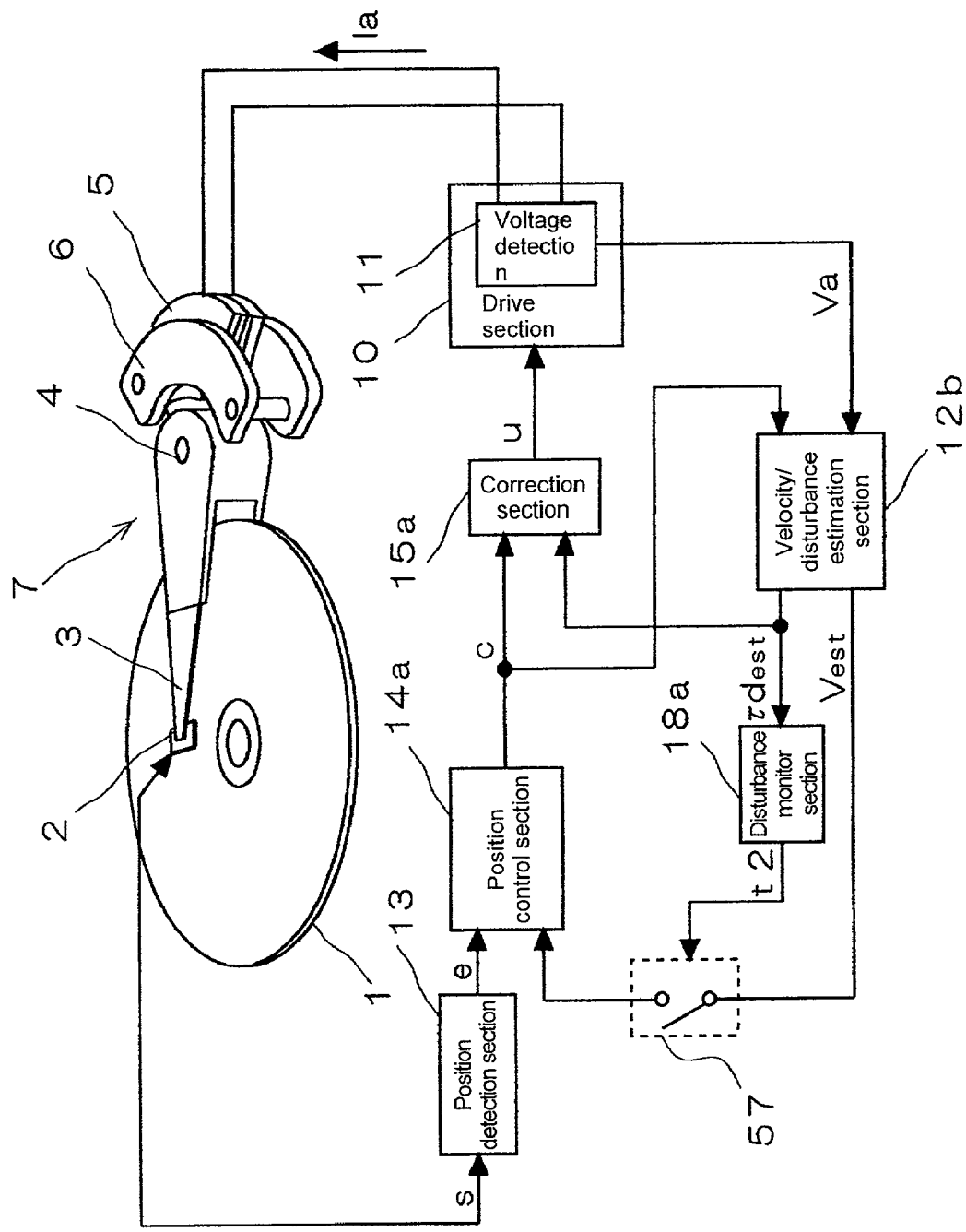
FIG. 13 is a block diagram showing a configuration of a magnetic disk storage apparatus according to a fourth embodiment of the present invention.

In the disk storage apparatus of the fourth embodiment shown in FIG. 13, a point different from the third embodiment of FIG. 9 is the signals inputted into the velocity/disturbance estimation section. That is, while the third embodiment of FIG. 9 has been configured such that the voltage signal Va produced by the voltage detection section 11 and the drive signal u inputted into the drive section 10 are inputted into the velocity/disturbance estimation section 12a, the fourth embodiment of FIG. 13 is configured such that the voltage signal Va produced by the voltage detection section 11 and the position control signal c produced by the position control section 14a are inputted into a velocity/disturbance estimation section 12b.

The disturbance estimation signal $\tau d_{est}$ produced by the velocity/disturbance estimation section 12b of FIG. 13 is inputted into the correction section 15a. The correction section 15a, into which the position control signal c produced by the position control section 14a and the disturbance estimation signal $\tau d_{est}$ of the velocity/disturbance estimation section 12b are inputted, implements a correction computing, and then outputs the drive signal u to the drive section 10.

Figure 14:
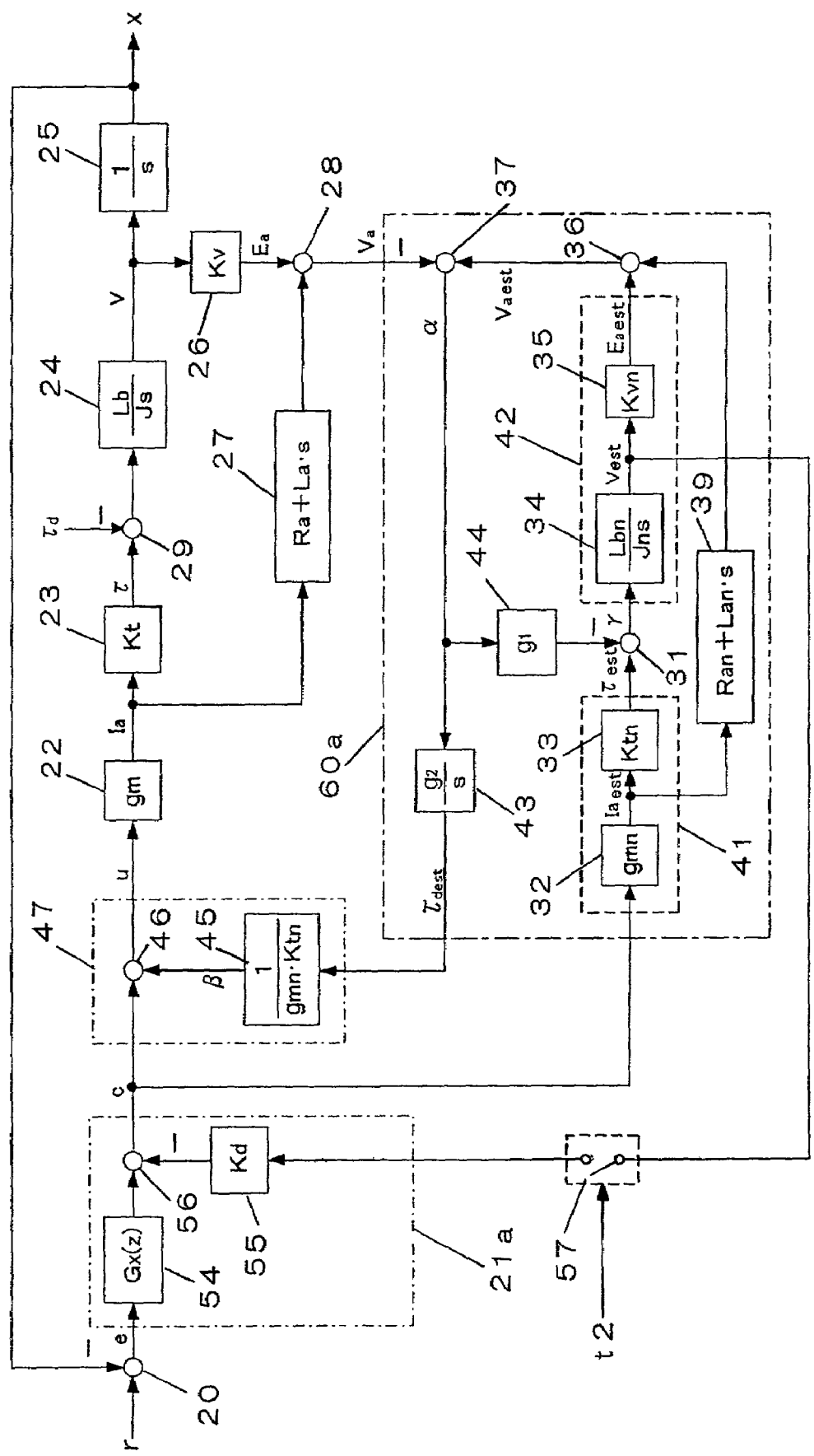
FIG. 14 is a block diagram showing the whole configuration of a positioning control system of the fourth embodiment of the present invention.

The block 60a surrounded with a single-dot chain line in FIG. 14 indicates a block diagram of the velocity/disturbance estimation section 12b. Inputted into the velocity/disturbance estimation section 12b are the voltage signal Va produced by the voltage detection section 11 as the output of the addition section 28 and the position control signal c produced by the position control section 14a expressed as the block 21a.

The above-mentioned velocity/disturbance estimation section 12a of the third embodiment has implemented the computing as follows: A signal obtained by multiplying the correction signal α by the coefficient g2/s of the block 43 of the first integration section and a signal obtained by multiplying the correction signal α by the coefficient g1 of the block 44 of the second integration section are added to each other at the addition section 38. The resultant signal and the drive torque estimation signal τest obtained by multiplying the coefficient $gm_n \cdot Kt_n$ of the block 41 of the first multiplication section are inputted into the subtraction section 31. The signal γ obtained by the subtraction at the subtraction section 31 is inputted into the block 42 of the second integration section. That is, the drive signal u to which the correction signal β has been added s inputted into the velocity/disturbance estimation section 12a, so that the addition section 38 of FIG. 10 has been required.

However, the velocity/disturbance estimation section 12b of the fourth embodiment is configured such that the position control signal c is inputted before the correction signal β is added thereto, so that the addition section 38 as shown in FIG. 10 is not required.

The relationship between the velocity/disturbance estimation section 12b of the fourth embodiment configured in this manner and the velocity/disturbance estimation section 12a of the third embodiment, is similar to that between the second embodiment and the first embodiment, so that the number of the addition sections required for the configuration of the velocity/disturbance estimation section 12b can be reduced compared to the disk storage apparatus of the third embodiment. Therefore, in the disk storage of the fourth embodiment, compared to the third embodiment, with a simpler configuration, the head moving velocity and the disturbance such as a bearing friction, an elastic force and an inertia force exerted on the arm 3 can be estimated, whereby the head positioning control can be stably implemented and the head 2 can be positioned to the target track formed of narrow track pitches at a high accuracy.

Further, in the disk storage apparatus of the fourth embodiment, the number of the addition sections has been reduced, whereby when the position control system is embodied in a hardware such as an analog circuit, the adjustment of the circuit can be simplified. When the position control system is embodied in a software, the computing time delay due to computing process can be shortened, thereby making the control band higher. The velocity/disturbance estimation section 12b configured as with the block 30a of FIG. 10 is not affected by the sampling frequency of the sector servo of the magnetic disk storage apparatus. Therefore, the control band of the velocity/disturbance estimation section 12b can be set at a value higher than that of the positioning control system.

In the above-mentioned embodiments 3 and 4, the block 54 included in the position control section 14a of FIGS. 10 and 14 implements the digital filter processing of the transfer function Gx (z) expressed by the formula 2. Here, the second term $a_d(1-z^{-1})$ in parentheses of the formula 2 is equivalent to a value obtained by differentiating the position error signal e (=r−x) as the position information. However, the subtraction section 56 included in the position control section 14a, to which the velocity term of the velocity estimation signal $v_{est}$ through the block 55 is negatively feedbacked, implements a processing equivalent to the differentiating of the position information Therefore, in the above-mentioned embodiments 3 and 4, the second term of the formula 2 may be omitted, whereby the digital filter processing of the transfer function Gx (z) can be simplified.

Fifth Embodiment

Figure 15:
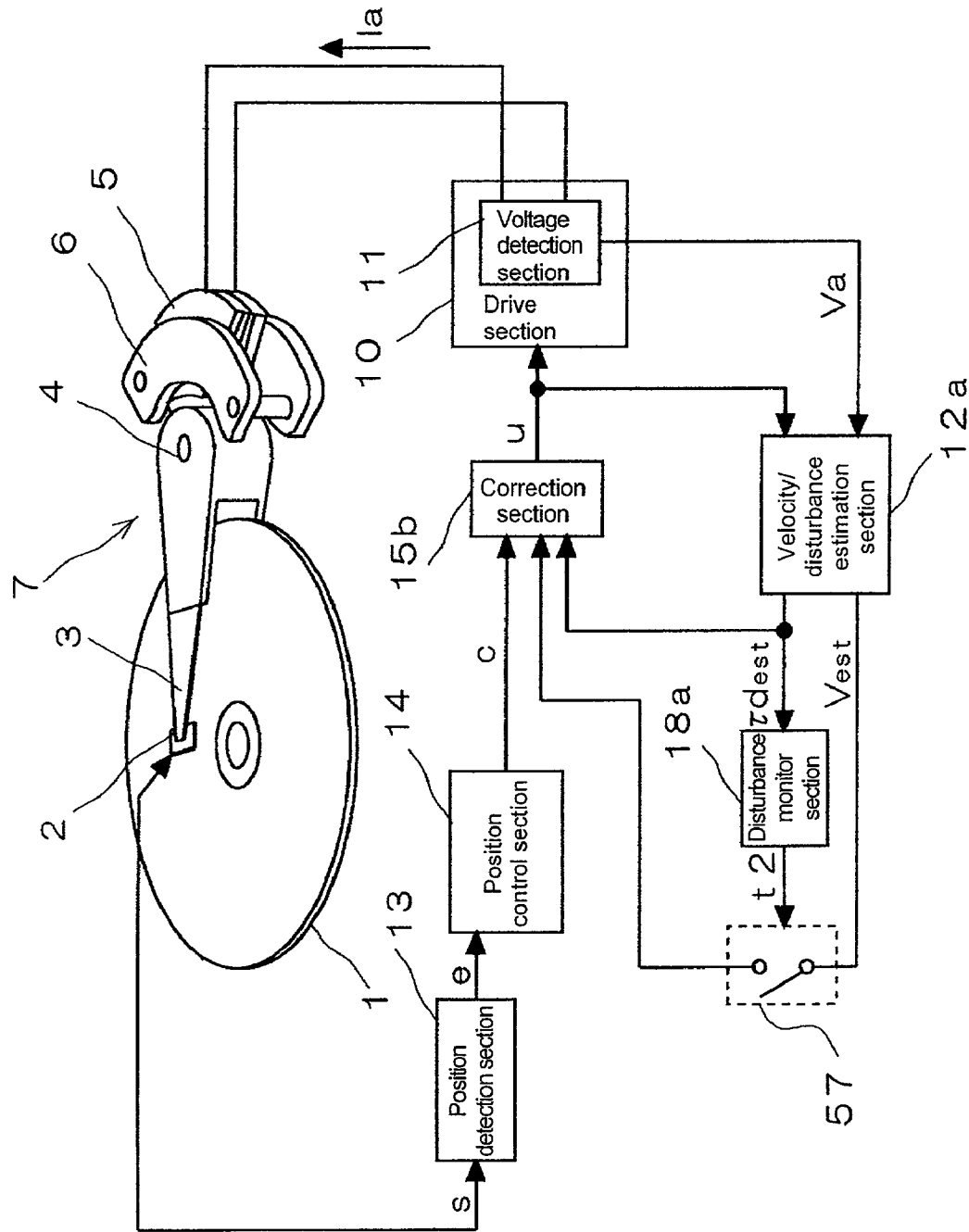
FIG. 15 is a block diagram showing a configuration of a magnetic disk storage apparatus according to a fifth embodiment of the present invention.
Figure 16:
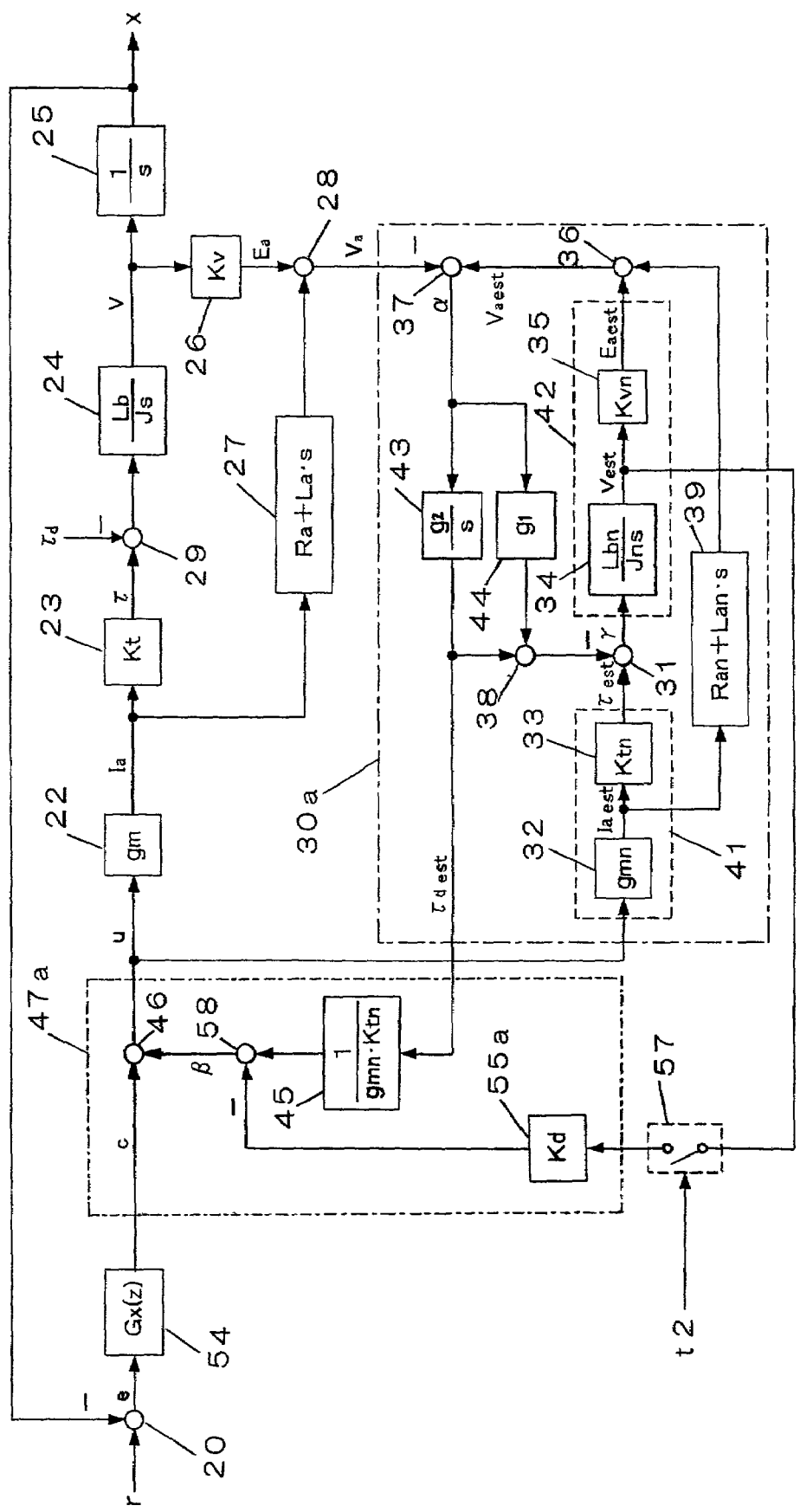
FIG. 16 is a block diagram showing the whole configuration of a positioning control system of the fifth embodiment of the present invention.

Using FIGS. 15 and 16, the disk storage apparatus according to the fifth embodiment of the present invention will be explained. This is equivalent to the modification of the third embodiment. Components having the same function as the third embodiment are indicated by the same symbols to omit a duplicated explanation. In FIG. 15, a point different from the configuration of FIG. 9 is that the destination into which the velocity estimation signal $v_{est}$ from the velocity/disturbance estimation section 12a is inputted through the switch 57 is the correction section 15b. In FIG. 16, a point different from FIG. 10 is that the velocity estimation signal $v_{est}$ is feedbacked through the switch 57 not to the block 21a corresponding to the position control section 14a, but to block 47a corresponding to the correction section 15b. The block 47a is provided with a subtraction section 58 and a block 55a of the transfer function Kd, in addition to the addition section 46 and the block 45, and the velocity estimation signal $v_{est}$ is inputted through the switch 57 into the block 55a, and the subtraction section 58 subtracts the output of the block 55a from the output of the block 45. FIG. 16 is equivalent to FIG. 10.

Sixth Embodiment

Figure 17:
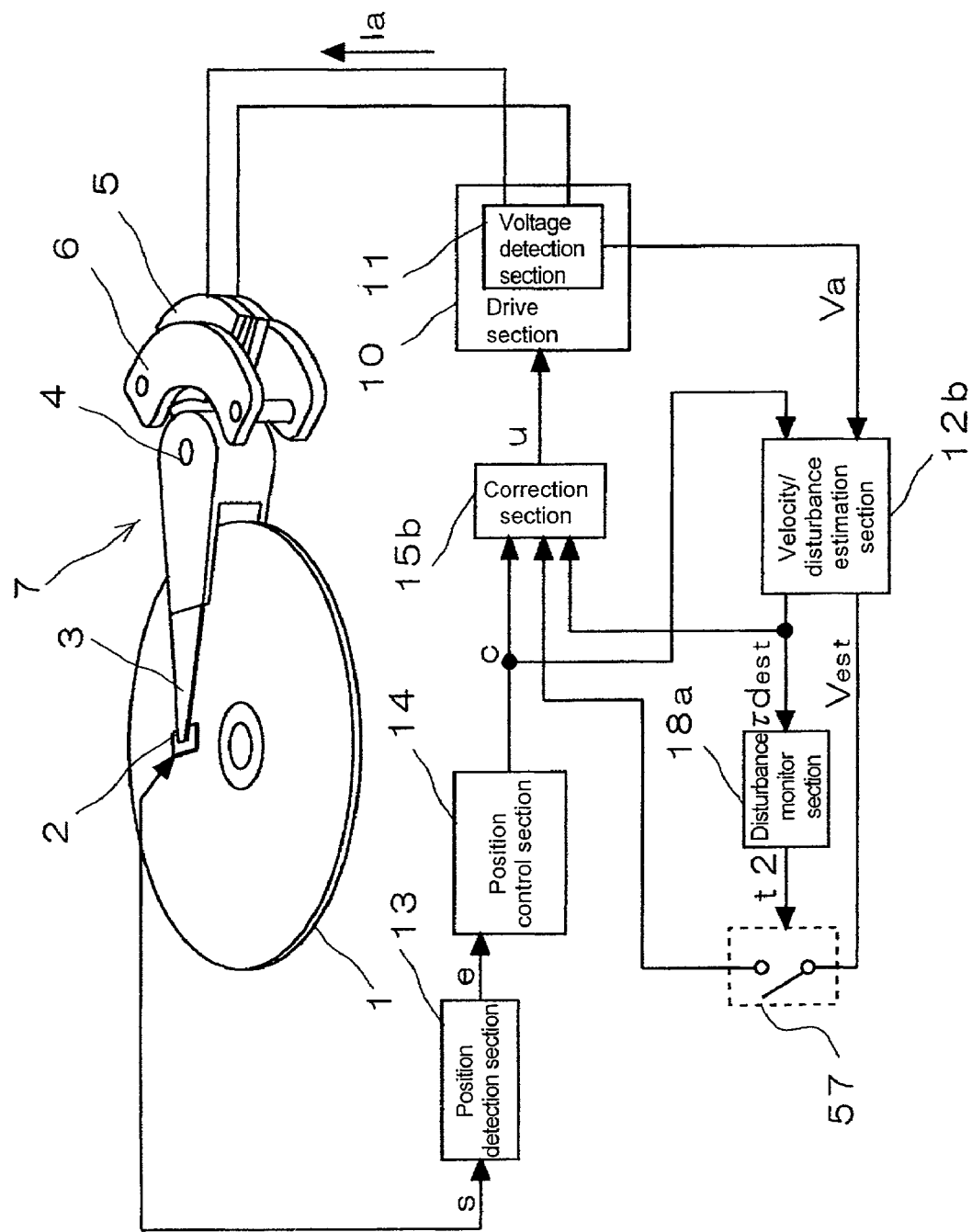
FIG. 17 is a block diagram showing a configuration of a magnetic disk storage apparatus according to a sixth embodiment of the present invention.
Figure 18:
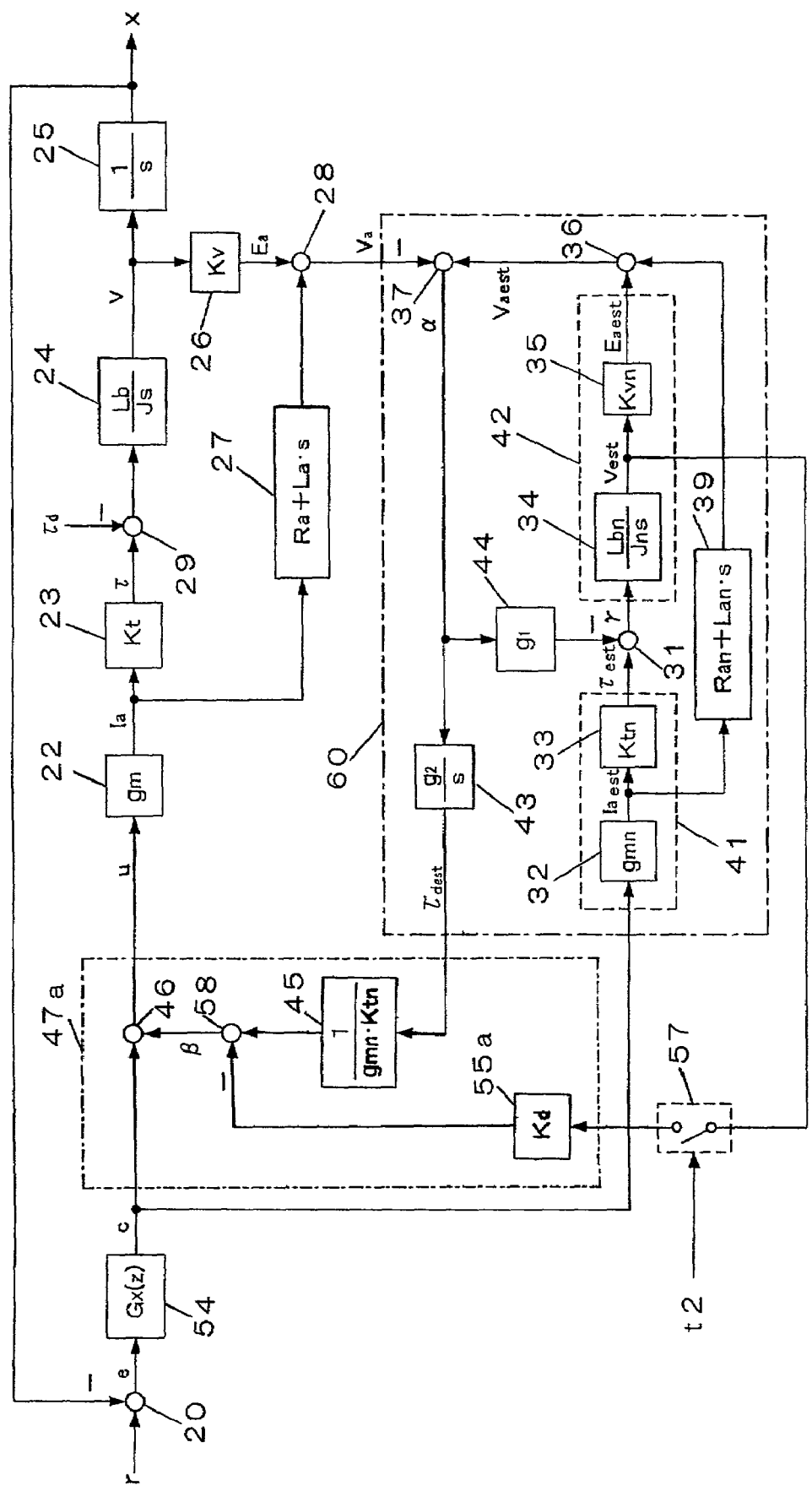
FIG. 18 is a block diagram showing the whole configuration of a positioning control system of the sixth embodiment of the present invention.

Using FIGS. 17 and 18, the disk storage apparatus according to the sixth embodiment of the present invention will be explained. This is equivalent to the modification of the fourth embodiment. Components having the same function as the fourth embodiment are indicated by the same symbols to omit a duplicated explanation. In FIG. 17, a point different from the configuration of FIG. 13 is that the destination into which the velocity estimation signal $v_{est}$ from the velocity/disturbance estimation section 12b is inputted through the switch 57 is the correction section 15b. In FIG. 18, a point different from FIG. 14 is that the velocity estimation signal $v_{est}$ is feedbacked through the switch 57 not to the block 21a corresponding to the position control section 14a, but to block 47a corresponding to the correction section 15b. The block 47a is provided with a subtraction section 58 and a block 55a of the transfer function Kd, in addition to the addition section 46 and the block 45, and the velocity estimation signal $v_{est}$ is inputted through the switch 57 into the block 55a, and the subtraction section 58 subtracts the output of the block 55a from the output of the block 45. FIG. 18 is equivalent to FIG. 14.

Seventh Embodiment

Figure 19:
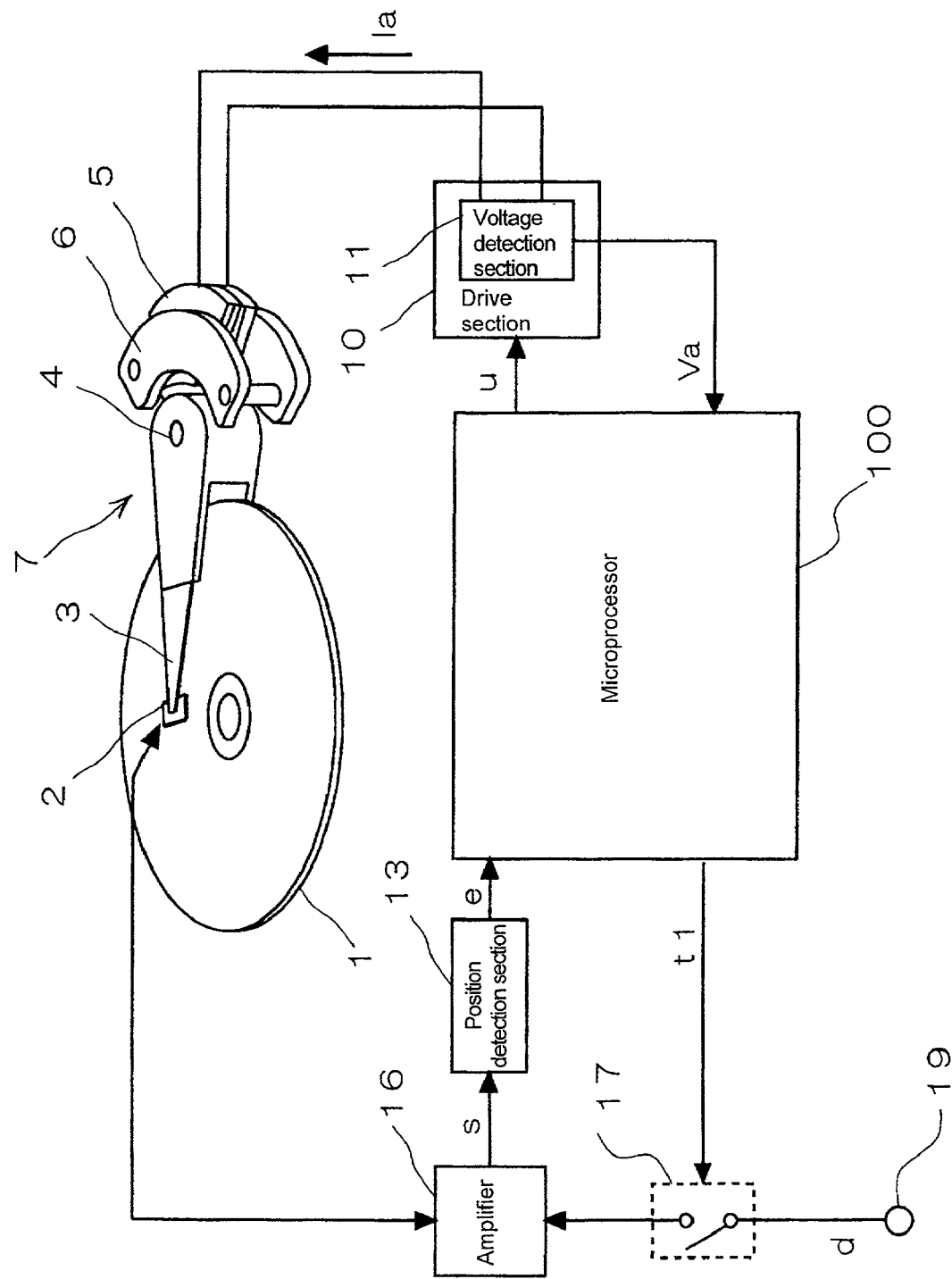
FIG. 19 is a block diagram showing a configuration of a magnetic disk storage apparatus according to a seventh embodiment of the present invention.
Figure 20:
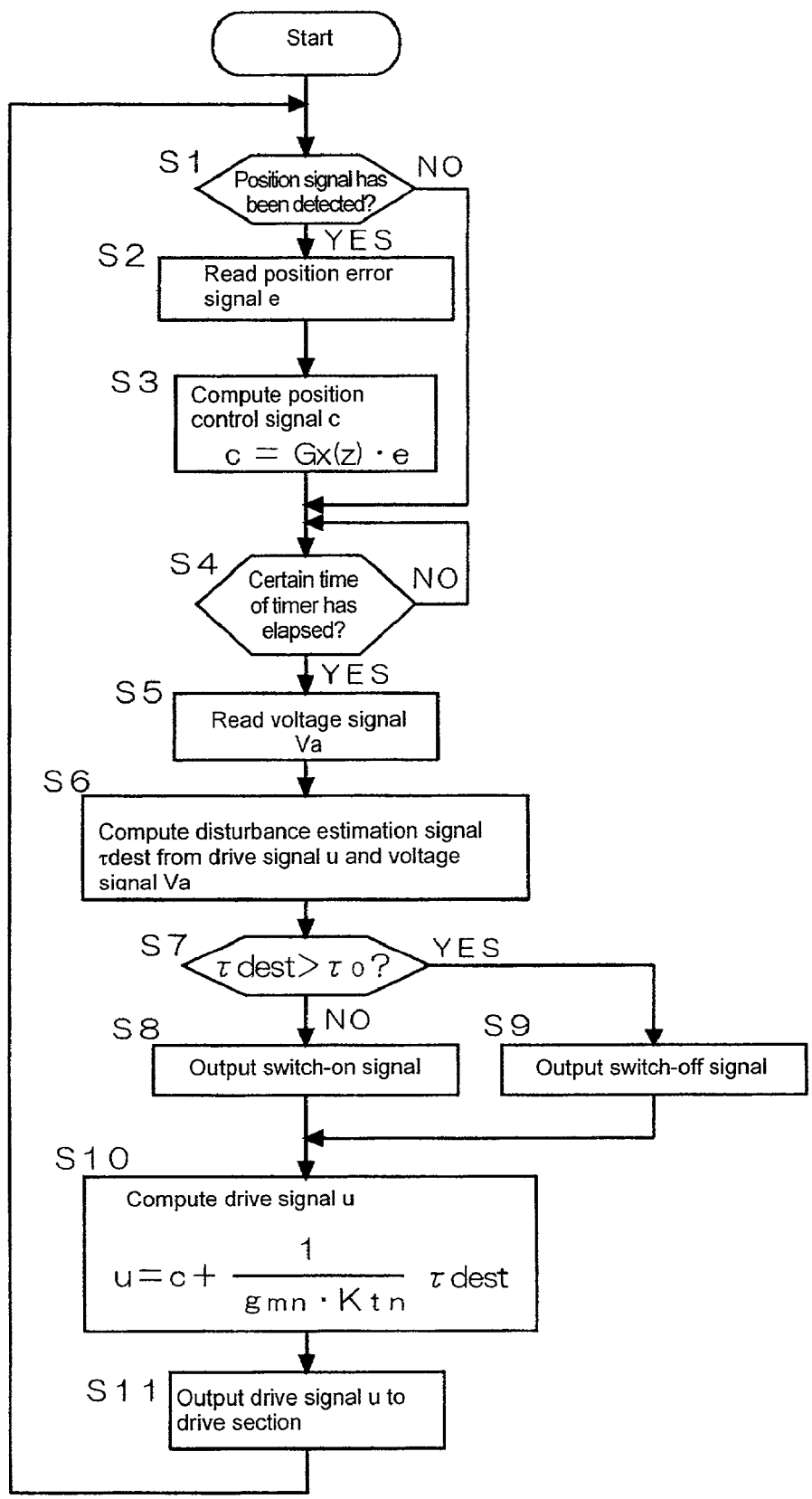
FIG. 20 is a flowchart showing the operation of a magnetic disk storage apparatus of the seventh embodiment.

Using FIGS. 19 and 20, the disk storage apparatus according to the seventh embodiment of the present invention will be explained. This is equivalent to the modification of the first embodiment. As shown in FIG. 19, instead of the position control section 14, the disturbance estimation section 12, the correction section 15 and the disturbance monitor section 18 in FIG. 1, a microprocessor 100 is provided between the position detection section 13 and the drive section 10. The microprocessor 100 implements a control according to a flowchart shown in FIG. 20.

At step S1, whether the position detection section 13 has detected a position signal is determined. When the signal has been detected, the process proceeds to step S2, where the position error signal e is read, and at step S3, the position control signal c is obtained by the following computing:

$$c = Gx(z) \cdot e \qquad \text{Formula 21}$$

Then, at step S4, the timer is started, and after a certain time has elapsed, the process proceeds to step S5. At step S5, the voltage signal Va is read from the voltage detection section 11 of the drive section 10, and at step S6, the disturbance estimation signal $\tau d_{est}$ is determined by the computing based on the drive signal u and the voltage signal Va. It is assumed that this is determined according to the logic having been already explained. Further, it is assumed that in a series of cycles, and in the first process of step S6, a proper initial value as the drive signal u is given.

Then, at step S7, whether the above-mentioned disturbance estimation signal $\tau d_{est}$ has exceeded a predetermined value $\tau_0$ is determined. When it has not exceeded the value as the result of the determination, the process proceeds to step S8, where a switch-on signal is outputted to the switch 17, while when the disturbance estimation signal $\tau d_{est}$ has exceeded the value, the process proceeds to step S9, where a switch-off signal is outputted to the switch 17. Then, at step S10, the drive signal u is determined by computing. The computing at this time is equivalent to the formula 17.

Then, at step S11, the drive signal u is outputted to the drive section 10, and then the process returns to step S41.

Eighth Embodiment

Figure 21:
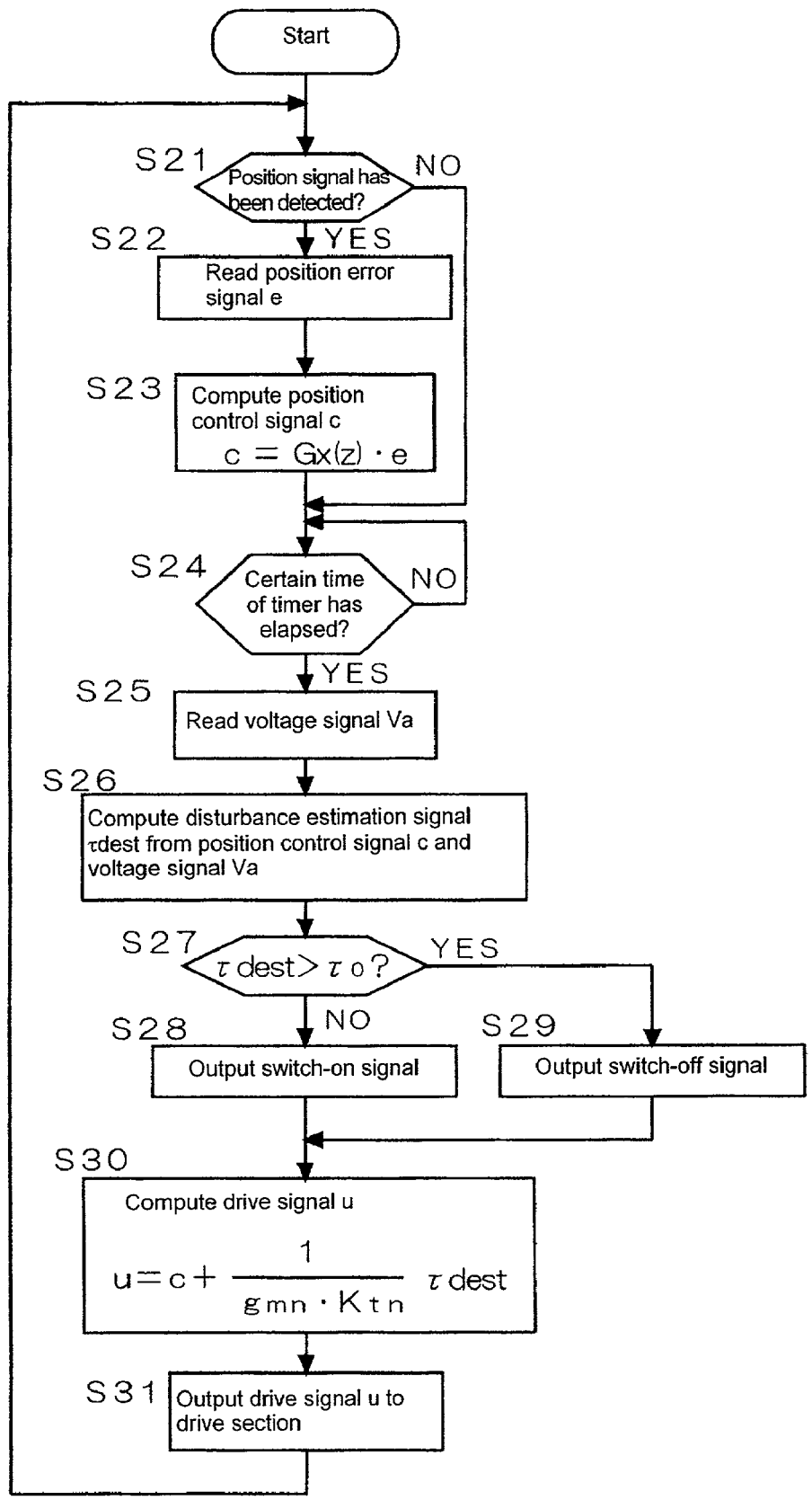
FIG. 21 is a flowchart showing the operation of a magnetic disk storage apparatus of an eighth embodiment.

Using FIG. 21, the disk storage apparatus according to the eighth embodiment of the present invention will be explained. This is equivalent to the modification of the second embodiment. In this embodiment, the configuration of FIG. 19 is applied. The microprocessor 100 implements a control according to a flowchart shown in FIG. 21. The different point from FIG. 20 is step S26. That is, at step S26, by the computing based on the position control signal c determined at step S23 and on the voltage signal Va read at step S25, the disturbance estimation signal $\tau d_{est}$ is determined. Other steps are similar to those of FIG. 20.

Ninth Embodiment

Figure 22:
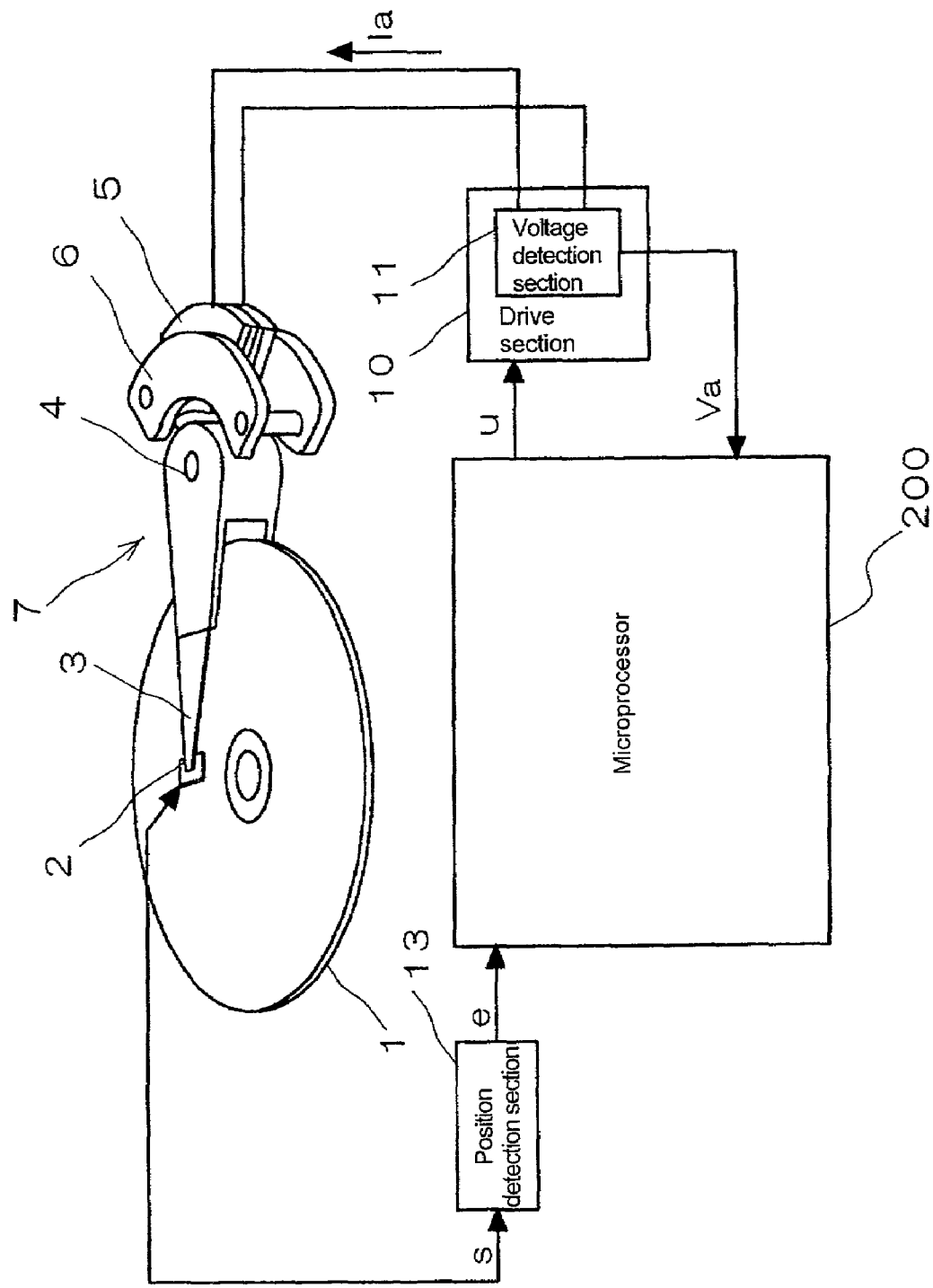
FIG. 22 is a block diagram showing a configuration of a magnetic disk storage apparatus according to a ninth embodiment of the present invention.
Figure 23:
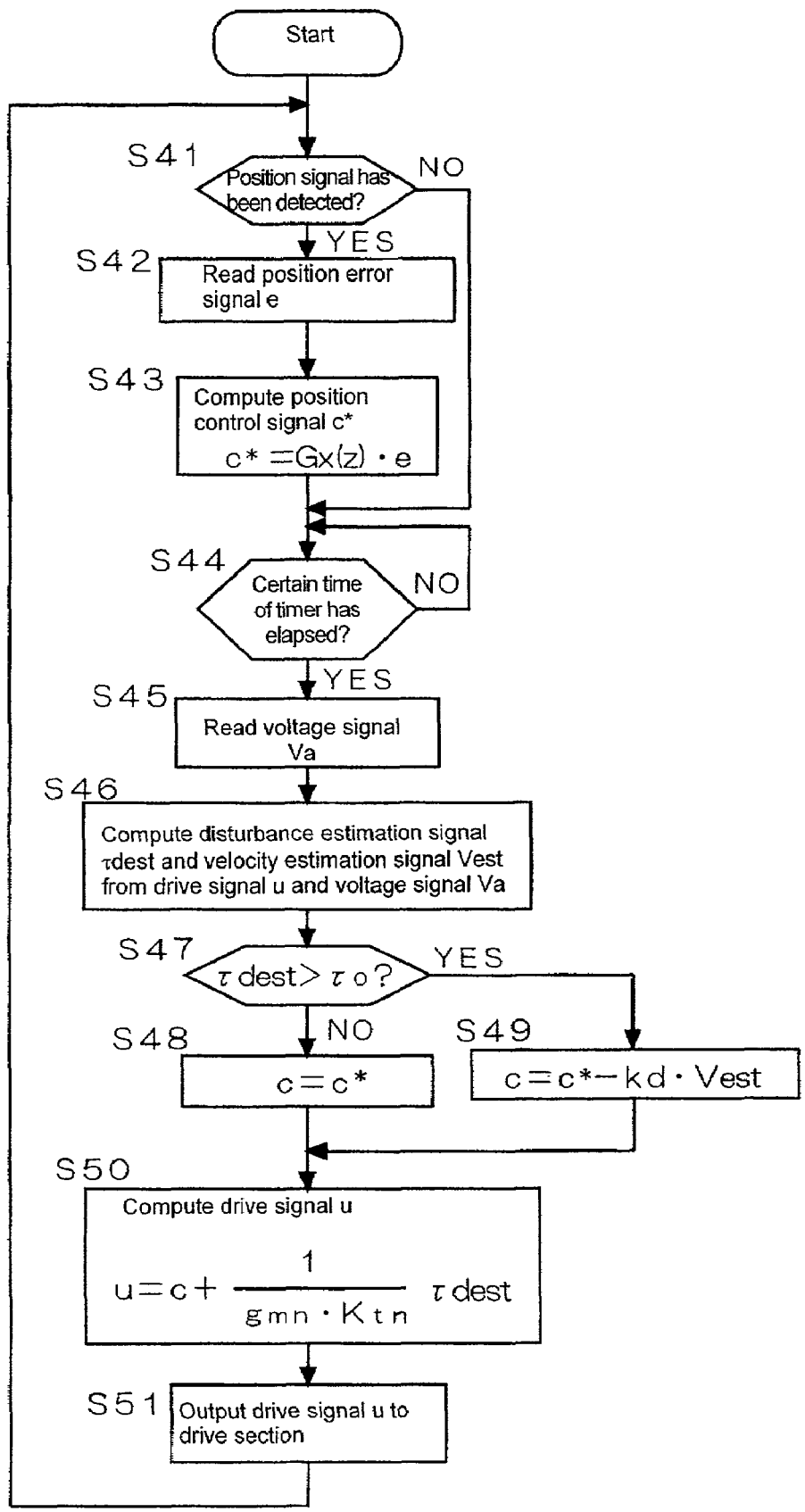
FIG. 23 is a flowchart showing the operation of a magnetic disk storage apparatus of the ninth embodiment.

Using FIGS. 22 and 23, the disk storage apparatus according to the ninth embodiment of the present invention will be explained. This is equivalent to the modification of the third embodiment. As shown in FIG. 22, instead of the position control section 14a, the velocity/disturbance estimation section 12a, the correction section 15a and the disturbance monitor section 18a in FIG. 9, a microprocessor 200 is provided between the position detection section 13 and the drive section 10. The microprocessor 200 implements a control according to a flowchart shown in FIG. 23.

At step S41, whether the position detection section 13 has detected a position signal is determined. When the signal has been detected, the process proceeds to step S42, where the position error signal e is read, and at step S43, the position control signal c* is obtained by the following computing:

$$c^* = Gx(z) \cdot e \qquad \text{Formula 22}$$

Then, at step S44, the timer is started, and after a certain time has elapsed, the process proceeds to step S45. At step S45, the voltage signal Va is read from the voltage detection section 11 of the drive section 10, and at step S46, the disturbance estimation signal $\tau d_{est}$ and the velocity estimation signal $v_{est}$ are determined by the computing based on the drive signal u and the voltage signal Va. It is assumed that these are determined according to the logic having been already explained. Further, it is assumed that in a series of cycles, and in the first process of step S46, a proper initial value as the drive signal u is given.

Then, at step S47, whether the above-mentioned disturbance estimation signal $\tau d_{est}$ has exceeded a predetermined value $\tau_0$ is determined. When it has not exceeded the value as the result of the determination, the process proceeds to step S48, where the position control signal c* by step 43 is substituted in the variable of the position control signal c. This is equal to the turning-off of the switch 57 of FIG. 9. When the disturbance estimation signal $\tau d_{est}$ has exceeded the predetermined value $\tau_0$, the process proceeds to step S49, where a value obtained by a required computing is substituted in the position control signal c. This is equal to the turning-on of the switch 57, and exhibits a control taking into account the velocity estimation signal $v_{est}$.

Then, at step S50, the drive signal u is determined by computing. The computing at this time is equivalent to the formula 17. Then, at step S51, the drive signal u is outputted to the drive section 10, and then the process returns to step S41.

Tenth Embodiment

Figure 24:
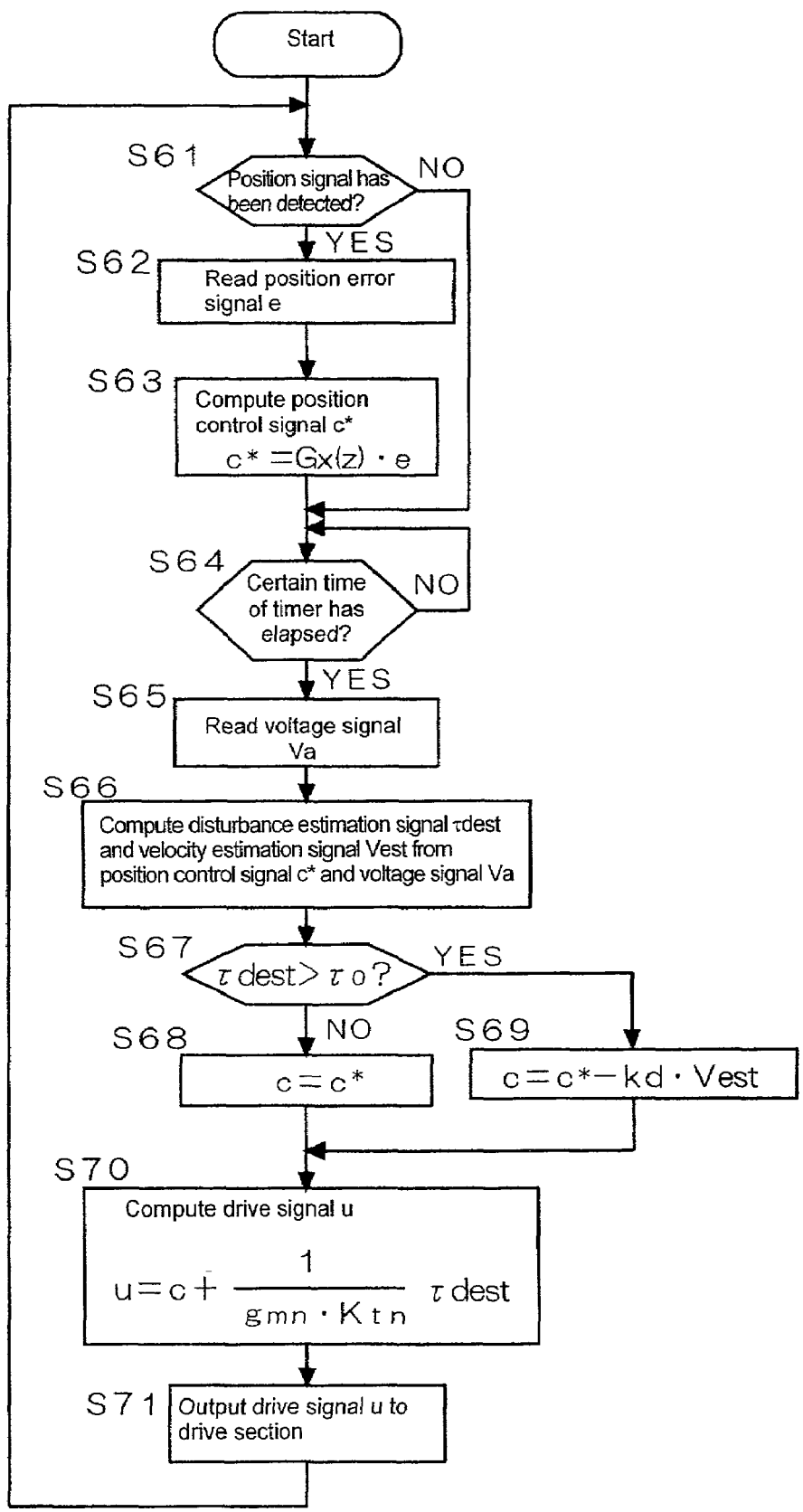
FIG. 24 is a flowchart showing the operation of a magnetic disk storage apparatus of the tenth embodiment.

Using FIG. 24, the disk storage apparatus according to the tenth embodiment of the present invention will be explained. This is equivalent to the modification of the fourth embodiment. In this embodiment, the configuration of FIG. 22 is applied. The microprocessor 200 implements a control according to a flowchart shown in FIG. 24. The different point from FIG. 23 is step S66. That is, at step S66, by the computing based on the position control signal c* determined at step S63 and on the voltage signal Va read at step 65, the disturbance estimation signal $\tau d_{est}$ and the velocity estimation signal $v_{est}$ are determined. Other steps are similar to those of FIG. 23. Step 68 is equivalent to the turning-off of the switch 57 of FIG. 9, while step S69 is equivalent to the turning-on of the switch 57.

While in the above-mentioned embodiments, there has been explained that the multiplication sections and the integration sections are configured by analog filters, they may be configured by digital filers. Further, respective sections constituting the position control system of respective embodiments may be embodied in a software by a microcomputer.

While the above-mentioned embodiments have been explained as the magnetic disk storage apparatus, the present invention is not limited to such apparatus, and can be applied an optical disk storage apparatus, a magneto-optical disk storage apparatus, and the like.

While the velocity/disturbance estimation sections have been illustrated as one block into which they are integrated, it is needless to say that instead of such configuration, the velocity estimation section and the disturbance estimation section may be configured as separated blocks.

While there has been described what is at present considered to be preferred embodiment of this invention, it will be understood that various modifications may be made therein, and it is intended to cover in the appended claims all such modifications as fall within the true spirit and scope of this invention.

What is claimed is:

1. A disk storage apparatus comprising:
   an actuator for positioning a head with respect to a disk;
   a drive section for driving said actuator;
   a position detection section for producing position error information corresponding to the current position of said head from servo information which has been previously recorded on said disk and is detected by said head;
   a position control section for producing position control information corresponding to the position error information by said position detection section;
   a voltage detection section for detecting a voltage generated in driving said actuator and outputting a voltage signal;
   a disturbance torque estimation section for estimating the magnitude of a disturbance exerted on said head from the voltage signal by said voltage detection section and a drive signal from said drive section, and producing disturbance estimation information;
   a correction section for correcting the position control information by said position control section with the disturbance estimation information by said disturbance torque estimation section and producing said drive signal; and
   a disturbance monitor section for monitoring the disturbance estimation information by said disturbance torque estimation section, and prohibiting a record by said head if said disturbance estimation information exceeds an allowable range.

2. The disk storage apparatus as set forth in claim 1, wherein said disturbance torque estimation section includes:
   a comparison section for receiving the voltage signal detected by said voltage detection section;
   a first multiplication section for multiplying the drive signal from said drive section by a first coefficient;

a second multiplication section for multiplying the output of said comparison section by a second coefficient;

a first integration section for integrating the output of said comparison section; and a second integration section for integrating a value obtained by subtracting the added value of the output of said second multiplication section and the output of said first integration section from the output of said first multiplication section, wherein said comparison section compares said voltage signal with the output of said second integration section, and outputs the result to said second multiplication section and said first integration section.

3. A disk storage apparatus comprising:

an actuator for positioning a head with respect to a disk;

a drive section for driving said actuator;

a position detection section for producing position error information corresponding to the current position of said head from servo information which has been previously recorded on said disk and is detected by said head;

a position control section for producing position control information corresponding to the position error information by said position detection section;

a voltage detection section for detecting a voltage generated in driving said actuator and outputting a voltage signal;

a disturbance torque estimation section for estimating the magnitude of a disturbance exerted on said head from the voltage signal by said voltage detection section and the position control information by said position control section, and producing disturbance estimation information;

a correction section for correcting the position control information by said position control section with the disturbance estimation information by said disturbance torque estimation section and producing said drive signal; and a disturbance monitor section for monitoring the disturbance estimation information by said disturbance torque estimation section, and prohibiting a record by said head if said disturbance estimation information exceeds an allowable range.

4. The disk storage apparatus as set forth in claim 3, wherein said disturbance torque estimation section includes:

a comparison section for receiving the voltage signal detected by said voltage detection section;

a first multiplication section for multiplying the position control information from position control section by a first coefficient;

a second multiplication section for multiplying the output of said comparison section by a second coefficient;

a first integration section for integrating the output of said comparison section; and a second integration section for integrating a value obtained by subtracting the output of said second multiplication section from the output of said first multiplication section, wherein said comparison section compares said voltage signal with the output of said second integration section, and outputs the result to said second multiplication section and said first integration section.

5. A disk storage apparatus comprising:

an actuator for positioning a head with respect to a disk;

a drive section for driving said actuator;

a voltage detection section for detecting a voltage generated in driving said actuator, and outputting a voltage signal;

a position detection section for producing position error information corresponding to the current position of said head from servo information which has been previously recorded on said disk and is detected by said head;

a velocity/disturbance torque estimation section for estimating a head moving velocity and the magnitude of a disturbance exerted on said head from the voltage signal by said voltage detection section and from a drive signal in said drive section, and producing velocity estimation information and disturbance estimation information;

a position control section for producing position control information corresponding in principle to the position error information by said position detection section and adding the velocity estimation information by said velocity/disturbance torque estimation section to said position error information according to predetermined conditions to produce position control information;

a correction section for correcting the position control information by said position control section with the disturbance estimation information by said velocity/disturbance torque estimation section and producing said drive signal; and a disturbance monitor section for monitoring the disturbance estimation information by said velocity/disturbance torque estimation section and when said disturbance estimation information exceeds an allowable range, making valid said velocity estimation information with respect to said position error information in said position control section.

6. The disk storage apparatus as set forth in claim 5, wherein said velocity/disturbance torque estimation section includes:

a comparison section for receiving the voltage signal detected by said voltage detection section;

a first multiplication section for multiplying the drive signal from said drive section by a first coefficient;

a second multiplication section for multiplying the output of said comparison section by a second coefficient;

a first integration section for integrating the output of said comparison section; and a second integration section for integrating a value obtained by subtracting the added value of the output of said second multiplication section and the output of said first integration section from the output of said first multiplication section, wherein said comparison section compares said voltage signal with the output of said second integration section, and outputs the result to said second multiplication section and said first integration section, and said second integration section produces said velocity estimation information therein.

7. A disk storage apparatus comprising:

an actuator for positioning a head with respect to a disk;

a drive section for receiving position control information and driving said actuator;

a voltage detection section for detecting a voltage generated in driving said actuator, and outputting a voltage signal;

a position detection section for producing position error information corresponding, to the current position of said head from servo information which has been previously recorded on said disk and is detected by said head;

a velocity/disturbance torque estimation section for estimating a head moving velocity and the magnitude of a disturbance exerted on said head from the voltage signal by said voltage detection section and from a drive signal in said drive section, and producing velocity estimation information and disturbance estimation information;

a position control section for producing position control information corresponding in principle to the position error information by said position detection section and adding the velocity estimation information by said velocity/disturbance torque estimation section to said position error information according to predetermined conditions to produce position control information; and a disturbance monitor section for monitoring the disturbance estimation information by said velocity/disturbance torque estimation section and when said disturbance estimation information exceeds an allowable range, making valid said velocity estimation information with respect to said position error information in said position control section, wherein said drive signal is obtained based on the position control information by said position control section.

8. The disk storage apparatus as set forth in claim 7, wherein said velocity/disturbance torque estimation section includes:

a comparison section for receiving the voltage signal detected by said voltage detection section;

a first multiplication section for multiplying the drive signal from said drive section by a first coefficient;

a second multiplication section for multiplying the output of said comparison section by a second coefficient;

a first integration section for integrating the output of said comparison section; and a second integration section for integrating a value obtained by subtracting the added value of the output of said second multiplication section and the output of said first integration section from the output of said first multiplication section, wherein said comparison section compares said voltage signal with the output of said second integration section, and outputs the result to said second multiplication section and said first integration section.

9. A disk storage apparatus comprising:

an actuator for positioning a head with respect to a disk;

a drive section for driving said actuator;

a voltage detection section for detecting a voltage generated in driving said actuator, and outputting a voltage signal;

a position detection section for producing position error information corresponding to the current position of said head from servo information which has been previously recorded on said disk and is detected by said head;

a velocity/disturbance torque estimation section for estimating a head moving velocity and the magnitude of a disturbance exerted on said head from the voltage signal by said voltage detection section and from position control information by a position control section, and producing velocity estimation information and disturbance estimation information;

a position control section for producing position control information corresponding in principle to the position error information by said position detection section and adding the velocity estimation information by said velocity/disturbance torque estimation section to said position error information according to predetermined conditions to produce position control information;

a correction section for correcting the position control information by said position control section with the disturbance estimation information by said velocity/disturbance torque estimation section and producing said drive signal; and a disturbance monitor section for monitoring the disturbance estimation information by said velocity/disturbance torque estimation section and when said disturbance estimation information exceeds an allowable range, making valid said velocity estimation information with respect to said position error information in said position control section.

10. The disk storage apparatus as set forth in claim 9, wherein said velocity/disturbance torque estimation section includes:

a comparison section for receiving the voltage signal detected by said voltage detection section;

a first multiplication section for multiplying the position control information from said position control section by a first coefficient;

a second multiplication section for multiplying the output of said comparison section by a second coefficient;

a first integration section for integrating the output of said comparison section; and a second integration section for integrating a value obtained by subtracting the output of said second multiplication section from the output of said first multiplication section, wherein said comparison section compares said voltage signal with the output of said second integration section, and outputs the result to said second multiplication section and said first integration section, and said second integration section produces said velocity estimation information therein.

11. A disk storage apparatus comprising: an actuator for positioning a head with respect to a disk; a drive section for driving said actuator;

a voltage detection section for detecting a voltage generated in driving said actuator, and outputting a voltage signal;

a position detection section for producing position error information corresponding to the current position of said head from servo information which has been previously recorded on said disk and is detected by said head;

a position control section for producing position control information corresponding to the position error information by said position detection section;

a velocity/disturbance torque estimation section for estimating a head moving velocity and the magnitude of a disturbance exerted on said head from the voltage signal by said voltage detection section and from a drive signal in said drive section, and producing velocity estimation information and disturbance estimation information;

a correction section for correcting the position control information by said position control section with the disturbance estimation information by said velocity/disturbance torque estimation section and adding the velocity estimation information to said position control information by said velocity/disturbance torque estimation section according to predetermined conditions to produce said drive signal; and a disturbance monitor section for monitoring the disturbance estimation information by said velocity/disturbance torque estimation section and when said disturbance estimation information exceeds an allowable range, making valid said velocity estimation information with respect to said position control information in said correction section.

12. The disk storage apparatus as set forth in claim 11, wherein said velocity/disturbance torque estimation section includes:

a comparison section for receiving the voltage signal detected by said voltage detection section;

a first multiplication section for multiplying the drive signal from said drive section by a first coefficient;

a second multiplication section for multiplying the output of said comparison section by a second coefficient;

a first integration section for integrating the output of said comparison section; and a second integration section for integrating a value obtained by subtracting the added value of the output of said second multiplication section and the output of said first integration section from the output of said first multiplication section, wherein said comparison section compares said voltage signal with the output of said second integration section, and outputs the result to said second multiplication section and said first integration section, and said second integration section produces said velocity estimation information therein.

13. A disk storage apparatus comprising:

an actuator for positioning a head with respect to a disk;

a drive section for driving said actuator;

a voltage detection section for detecting a voltage generated in driving said actuator, and outputting a voltage signal;

a position detection section for producing position error information corresponding to the current position of said head from servo information which has been previously recorded on said disk and is detected by said head;

a position control section for producing position control information corresponding to the position error information by said position detection section;

a velocity/disturbance torque estimation section for estimating a head moving velocity and the magnitude of a disturbance exerted on said head from the voltage signal by said voltage detection section and from position control information by said position control section, and producing velocity estimation information and disturbance estimation information;

a correction section for correcting the position control information by said position control section with the disturbance estimation information by said velocity/disturbance torque estimation section and adding the velocity estimation information to said position control information by said velocity/disturbance torque estimation section according to predetermined conditions to produce said drive signal; and a disturbance monitor section for monitoring the disturbance estimation information by said velocity/disturbance torque estimation section and when said disturbance estimation information exceeds an allowable range, making valid said velocity estimation information with respect to said position control information in said correction section.

14. The disk storage apparatus as set forth in claim 13, wherein said velocity/disturbance torque estimation section includes:

a comparison section for receiving the voltage signal detected by said voltage detection section;

a first multiplication section for multiplying the position control signal from said position control section by a first coefficient;

a second multiplication section for multiplying the output of said comparison section by a second coefficient;

a first integration section for integrating the output of said comparison section; and a second integration section for integrating a value obtained by subtracting the output of said second multiplication section from the output of said first multiplication section, wherein said comparison section compares said voltage signal with the output of said second integration section, and outputs the result to said second multiplication section and said first integration section, and said second integration section produces said velocity estimation information therein.

* * * * *